United States Patent [19]
Halling et al.

[11] Patent Number: 5,505,498
[45] Date of Patent: Apr. 9, 1996

[54] FLEXIBLE PRESSURE-ENERGIZED JOINT

[75] Inventors: Horace P. Halling, Sykesville, Md.; Mark Simon, Redmond, Wash.

[73] Assignee: EG&G Pressure Science, Inc., Beltsville, Md.

[21] Appl. No.: 243,322

[22] Filed: May 16, 1994

[51] Int. Cl.⁶ .................................................. F16L 17/035
[52] U.S. Cl. .................. 285/111; 285/263; 285/379; 285/917; 285/906; 277/236
[58] Field of Search ................... 285/111, 263, 285/379, 917, 906; 277/236

[56] References Cited

U.S. PATENT DOCUMENTS

| | | | |
|---|---|---|---|
| 1,155,495 | 10/1915 | Leake . | |
| 2,005,556 | 6/1935 | Parker | 285/95 |
| 2,451,437 | 10/1948 | Fenlon | 285/93 |
| 2,502,753 | 4/1950 | Rohr | 285/91 |
| 2,840,394 | 6/1958 | Rohr | 285/226 |
| 2,846,242 | 8/1958 | Drake | 285/263 |
| 3,033,595 | 5/1962 | Bard | 285/263 X |
| 3,142,498 | 7/1964 | Press | 285/917 X |
| 3,165,339 | 1/1965 | Faccou | 285/263 |
| 3,635,499 | 1/1972 | Reddy | 285/111 |
| 3,656,784 | 4/1972 | Dow et al. | 285/187 |
| 3,663,043 | 5/1972 | Walton | 285/113 |
| 3,797,836 | 3/1974 | Halling | 277/200 |
| 3,799,586 | 3/1974 | Caras et al. | 285/98 |
| 3,995,896 | 12/1976 | Decker | 285/233 |
| 4,006,881 | 2/1977 | Gaillard | 251/214 |
| 4,071,268 | 1/1978 | Halling et al. | 285/917 X |
| 4,071,269 | 1/1978 | Halling et al. | 285/165 |
| 4,121,843 | 10/1978 | Halling et al. | 277/200 |
| 4,165,107 | 8/1979 | Affa et al. | 285/41 |
| 4,427,220 | 1/1984 | Decker | 285/263 |
| 4,448,449 | 5/1984 | Halling et al. | 285/263 |
| 4,597,596 | 7/1986 | Tozer | 285/917 X |
| 4,779,901 | 10/1988 | Halling | 285/184 |
| 4,826,028 | 5/1989 | Vassallo et al. | 285/379 X |
| 5,354,107 | 10/1994 | Takikawa | 285/917 X |
| 5,374,086 | 12/1994 | Higgins | 285/917 X |

FOREIGN PATENT DOCUMENTS 30062  6/1981  European Pat. Off. ............... 285/379

*Primary Examiner*—Dave W. Arola
*Attorney, Agent, or Firm*—Roylance, Abrams, Berdo & Goodman

[57] ABSTRACT

A fluid-tight coupling and sealing arrangement including a flexible joint for coupling a tube with pressurized fluid flowing therethrough to another tube or a fluid device. The flexible joint basically includes a first tubular member with an outer restraining member coupled thereto, a second tubular member, and a pressure-energized seal positioned between the first and second tubular members. The first tubular member has a first fluid passageway and a first annular sealing surface. The second tubular member has a second fluid passageway, a second annular sealing surface, and an outwardly facing bearing surface. The outer restraining member carries an inwardly facing bearing surface for engaging the outwardly facing bearing surface of the second tubular member. In some embodiments, the bearing surface of the outer restraining member is integrally formed therewith, while in other embodiments, the bearing surface is formed by a separate bearing ring such as a carbon-graphite insert carried by the outer restraining member. Also, in some embodiments, the outer restraining member is fixedly coupled to the first tubular member, while in other embodiments, the outer restraining member is releasably coupled to the first tubular member.

44 Claims, 13 Drawing Sheets

FLEXIBLE PRESSURE-ENERGIZED JOINT

FIELD OF THE INVENTION

This invention relates to a fluid-tight coupling and sealing arrangement for joining a first tube or conduit with a pressurized fluid flowing therethrough to a second tube or fluid device. More specifically, this invention relates to a flexible joint capable of angular and rotational flexibility. The flexible joint includes an annular pressure-energized seal positioned between a pair of annular sealing surfaces.

BACKGROUND OF THE INVENTION

Piping systems for distributing high pressure and temperature fluids are generally designed to provide some degree of flexibility to allow for dimensional tolerances, thermal expansion and contraction, and vibrational or structural deflections between the various components which are connected by the piping. For example, ducting systems are used in aircraft for distributing high pressure air tapped from the turbine engine compressors to environmental (pressure and temperature) controls in aircraft cabins, wing and nacelle leading edge de-icing systems and numerous other pneumatic systems.

Lightweight compact assemblies, which are particularly desirable in aircraft and missile systems, for providing such flexibility are known in the prior art. However, some of these prior art devices employ elastomeric, plastic, rubber or asbestos type seals to prevent leakage of the fluid flowing in the flexible system. A shortcoming of these types of seals is that they tend to fail when exposed to high temperatures above approximately 400° F.–500° F., very low temperatures, or radiation.

Other sealing assemblies used in flexible piping systems in environments beyond the capability of elastomeric seals and the like employ sections of piping with circumferential corrugations, i.e., bellows, expansion loops, or devices containing piston rings. Such hermetically-sealed flexible joints are known as bellows-sealed ball and gimbal joints. However, these joints or sealing systems are generally very heavy, require large amounts of space, and are prone to failure and, therefore, leakage, due to fragility and wear. Moreover, these joints or sealing systems often require exact tolerances and are difficult to manufacture and install.

In certain cases, there is insufficient space in ducting system installations to accommodate the length of presently available metallic bellows-sealed flexible joints. There may also be a need for a flexible joint with a rotational degree of freedom, which cannot be obtained by using a joint comprising a metallic bellows seal.

Solving these problems, it is known to utilize metal to metal seals in such an environment as disclosed in prior U.S. Pat. Nos. 4,054,306 to Sadoff et al; 4,071,268 to Halling et al and 4,071,269 to Halling et al. At higher temperatures, above for example 900° F., the seals disclosed in these patents perform extremely satisfactorily and leakage of fluid is minimal. This is because while a rubbing action of the two metallic parts, which are in sliding contact, tends to gall the contacting parts, an oxide film is continuously formed, maintaining a lubricous, non-galling surface. However, it has been noted that at more moderate temperatures this oxide film does not regenerate, and thus galling tends to roughen the metallic surfaces, thereby increasing the chance of leakage of fluid between them.

In addition to maintaining the seal between joined pipes, it is important to provide a mechanism that allows for rotation and angulation between adjacent pipes. Earlier non-bellows flexible joints, such as those shown in U.S. Pat. Nos. 4,071,269 to Halling et al and 4,448,449 to Halling, et al, provided all degrees of freedom, including rotational freedom but had little advantage over bellows-sealed joints in terms of length. Joints produced by others that had the capability of rotational freedom and could have been made shorter, suffered from high leakage due to the absence of pressure-energization and from rapid wear of their sealing elements. Moreover, the position of their seals and the unsuitability of their materials make these joints unsuitable for long term service in high vibration environment at high temperatures and pressures. Examples of such joints are shown in U.S. Pat. No. 4,427,220 to Decker.

Other examples of such prior art devices are disclosed in the following U.S. Pat. Nos. 1,155,495 to Leake; 2,005,556 to Parker; 2,451,437 to Fenlon; 2,502,753 to Rohr; 2,840,394 to Rohr; 2,846,242 to Drake; 3,033,595 to Bard; 3,165,339 to Faccou; 3,663,043 to Walton; 3,656,784 to Dow et al; 3,799,586 to Caras et al; 3,995,896 to Decker; 4,006,881 to Gaillard; and 4,165,107 to Affa et al. These prior art flexible joints, including bellows-sealed joints, do not combine the necessary capabilities for use in tight spaces which requires a light and compact joint arrangement.

In view of the above, there exists a need in the art for a flexible joint which is short in longitudinal length and can provide sufficient angular and rotational movements for installation in small spaces. This invention addresses this need in the art, as well as other needs which will become apparent to those skilled in the art once given this disclosure.

SUMMARY OF THE INVENTION

An object of the present invention is to provide a flexible joint with a pressure-energized seal in a piping or ducting system having high pressure fluid flowing therethrough which can work at moderate temperatures and is capable of angular and rotational flexibility.

Another object of the present invention is to provide a flexible Joint having a short longitudinal length so as to be readily used in small spaces in ducting systems such as aircraft systems.

Another object of the present invention is to provide a flexible joint which is reliable in high vibration environment at high temperatures and pressures.

The foregoing objects are basically attained by providing a flexible pressure-energized joint, comprising: a first tubular member with a first fluid passageway arranged about a first longitudinal axis and a first annular sealing surface; a second tubular member with a second fluid-passageway arranged about a second longitudinal axis, a second annular sealing surface and an outwardly facing bearing surface; an outer restraining member coupled to the first tubular member to form an annular cavity for receiving a portion of the second tubular member with the outwardly facing bearing surface therein, and carrying an inwardly facing bearing surface for engaging the outwardly facing bearing surface of the second tubular member to allow rotational and angular movements therebetween; and a pressure-energized seal positioned between the first and second annular sealing surfaces of the first and second tubular members, the pressure-energized seal including an annular bight, a first annular leg extending from the bight for engaging the first sealing surface of the first tubular member, and a second annular leg extending from the bight for engaging the second sealing surface of the second tubular member, the second annular leg being spaced from the first annular leg to form an annular space in fluid communication with at least one of the first and second passageways, one of the first and second annular legs being slidably engaging one of the first and second sealing surfaces during rotational and angular movements between the first and second tubular members.

Other objects, advantages and salient features of the present invention will become apparent to those skilled in the art from the following detailed description which, taken in conjunction with the annexed drawings, discloses several preferred embodiments of the present invention.

BRIEF DESCRIPTION OF THE DRAWINGS

Referring now to the drawings which form a part of this original disclosure.

DETAILED DESCRIPTION OF THE INVENTION

Figure 1:
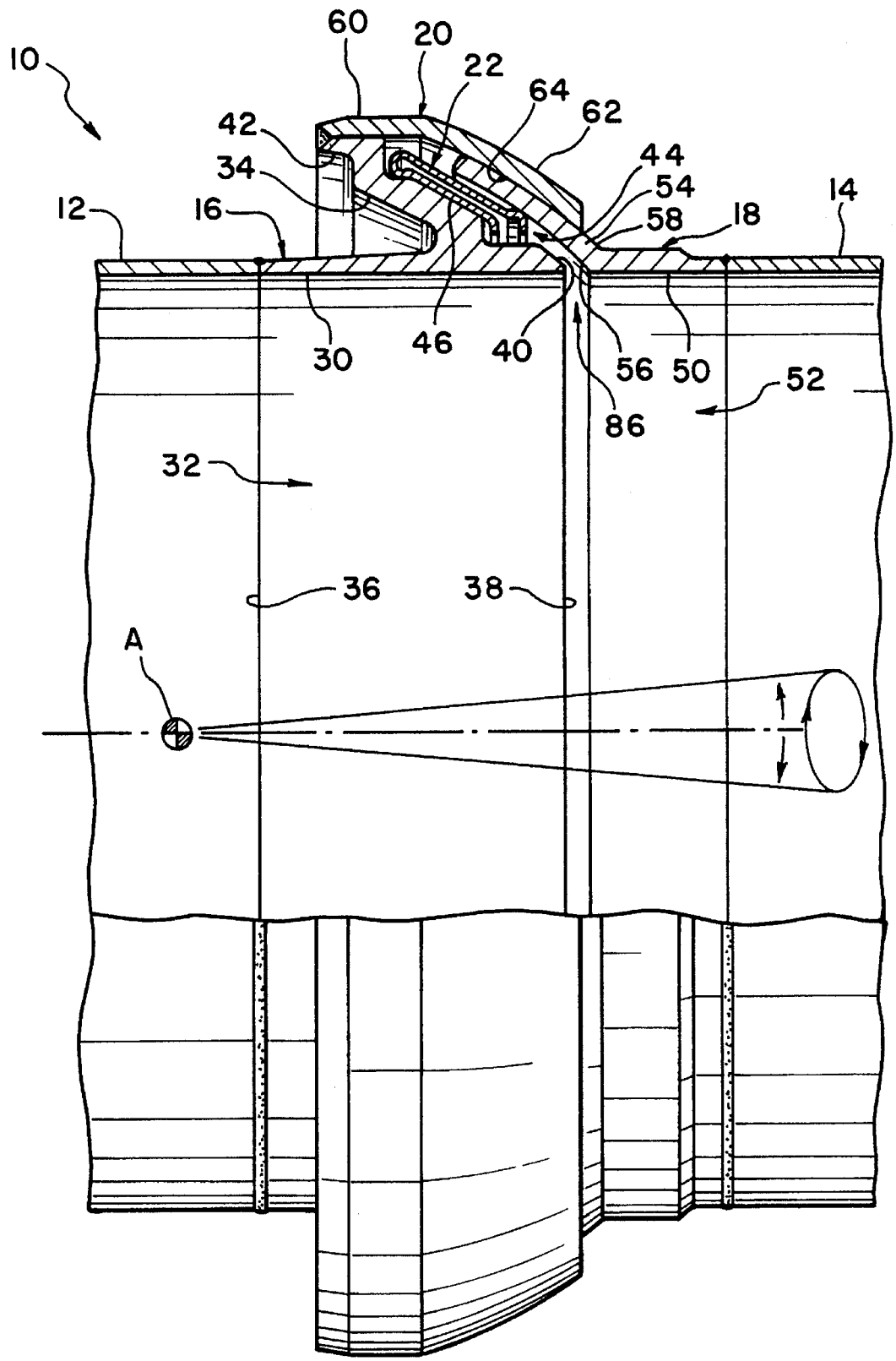
FIG. 1 is a side elevational view in partial longitudinal section of a flexible pressure-energized joint in accordance with a first embodiment of the present invention coupling a pair of conduits or tube together with these tubes having their center lines aligned.

Referring initially to FIGS. 1–5, a flexible joint 10 for use in a piping or ducting system is illustrated in accordance with a first embodiment of the present invention. Flexible joint 10 is illustrated as being coupled between a first tube or conduit 12 and a second tube or conduit 14 having common longitudinal axes or center lines. Of course, flexible joint 10 can be used in a variety of ways in a ducting system as will become apparent to those skilled in the art from this disclosure.

Basically, flexible joint 10 includes a first tubular member 16 rigidly coupled to tube 12, a second tubular member 18 rigidly coupled to tube 14 and movably coupled to first tubular member 16, an outer restraining member 20 rigidly coupled to first tubular member 16 and movably coupled to second tubular member 18, and a pressure-energized seal 22 positioned between first tubular member 16 and second tubular member 18. Flexible joint 10 movably couples first tube 12 to second tube 14 so that the center lines of tubes 12 and 14 are normally axially aligned prior to angulation. First tubular member 16 along with outer restraining member 20 and seal 22 are concentrically arranged about the center line of tube 12, while second tubular member 18 is concentrically arranged about the center line of tube 14.

Figure 2:
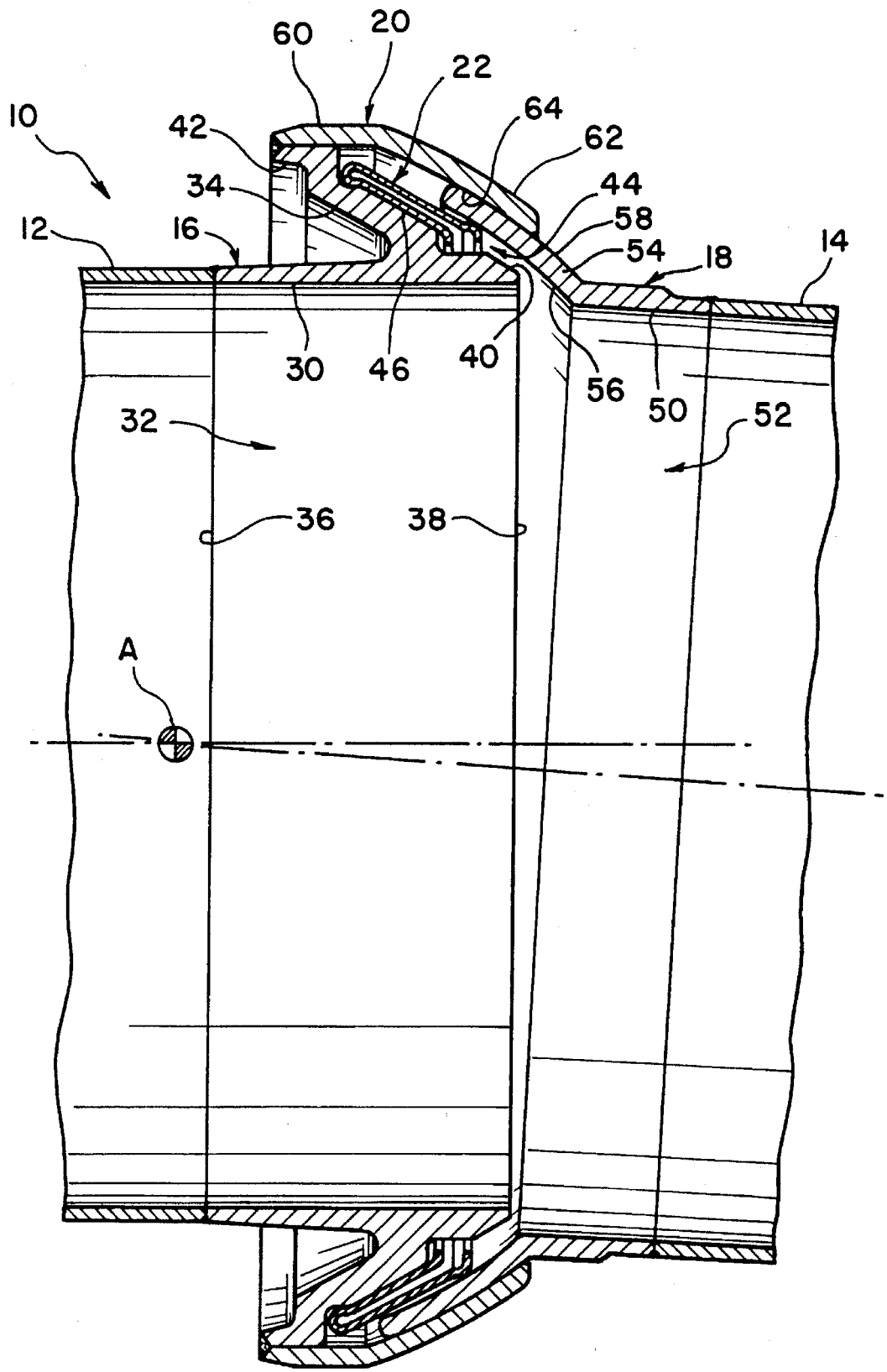
FIG. 2 is a side elevational view in partial longitudinal section of the flexible pressure-energized joint illustrated in FIG. 1, except the center lines of the two tubes are angularly misaligned by angle.

As seen in FIG. 2, when flexible joint 10 is angulated about its spherical center "A" by angulating the axis of one of the tubular members 16 or 18 relative to the axis or center line of the other of the tubular members 16 or 18, the contact pressures between seal 22 and the first and second tubular members 16 and 18 remain substantially constant. Likewise, the contact pressures between seal 22 and tubular members 16 and 18 remain constant when one of the tubular members 16 or 18 is rotated relative to the other tubular member 16 or 18.

Preferably, flexible joint 10 can angulate approximately ±5°. Flexible joint 10 can accommodate slight deflections of the components which occur under normal operating conditions such as from thermal expansion, structural deflections and tolerance accumulations. These slight deflections often lead to small deviations in the sealing surfaces from their spherical forms. Seal 22 accommodates these small deviations by deflections of the seal 22, which is capable of conforming to the changed shape of the mating components due to its resiliency and compliancy, as discussed more particular hereinafter.

Figure 3:
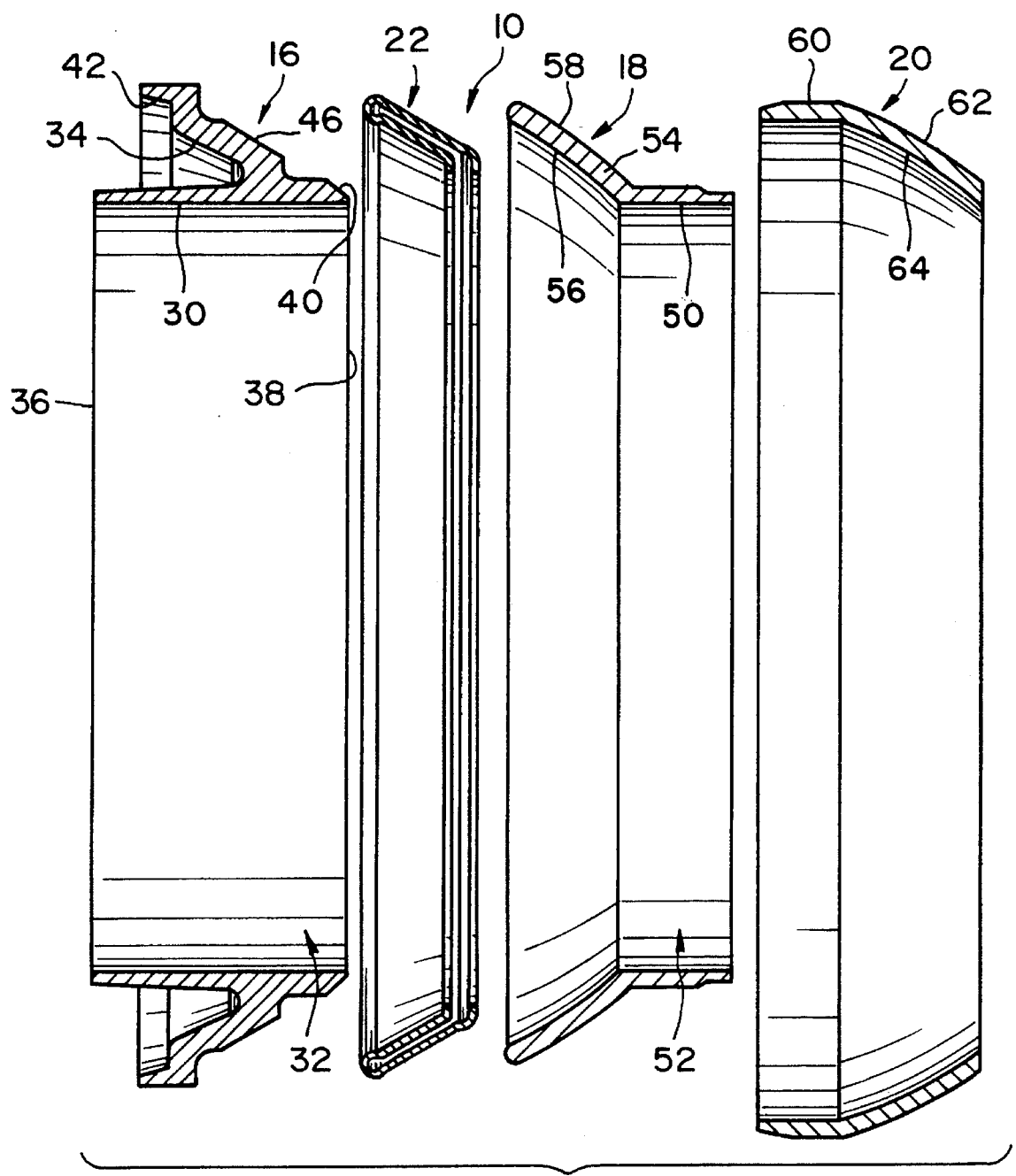
FIG. 3 is an exploded side elevational view of the flexible pressure-energized joint illustrated in FIGS. 1 and 2.
Figure 4:
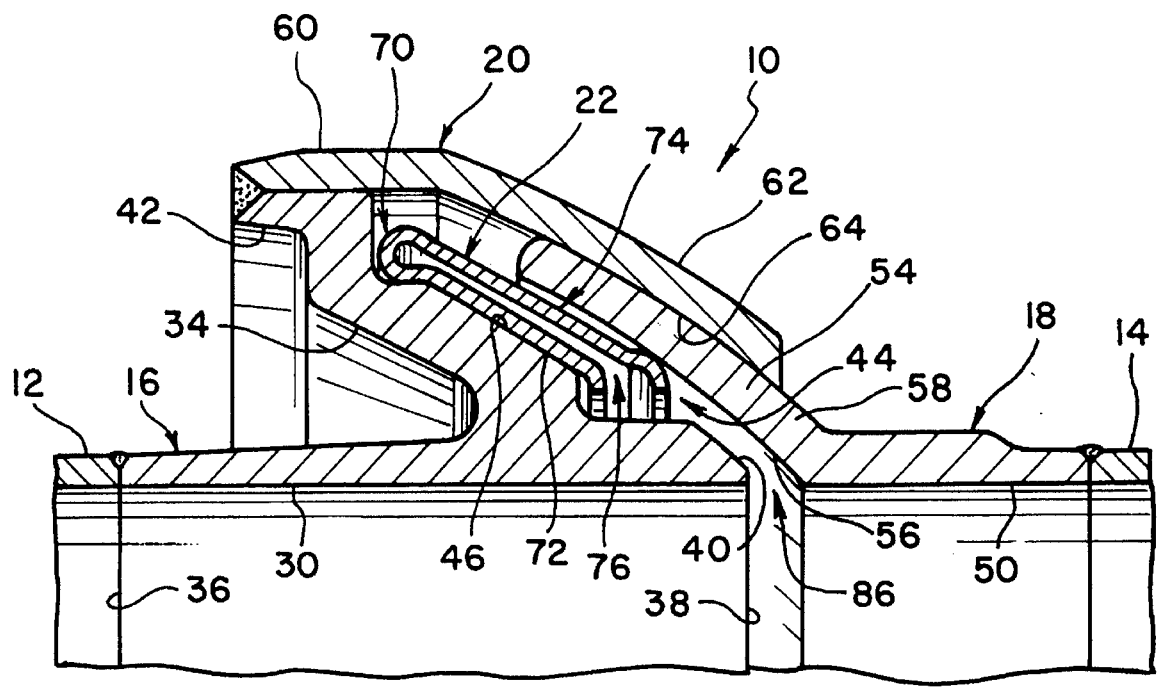
FIG. 4 is an enlarged, partial side elevational view of the flexible pressure-energized joint illustrated in FIGS. 1–3.

As particularly seen in FIGS. 3 and 4, first tubular member 16 is in the form of a tube adaptor for rigidly coupling first tube 12 by welding or the like to flexible joint 10. First tubular member 16 is made from a rigid metallic material such as stainless steel, nickel alloy or titanium. First tubular member 16 includes a substantially cylindrical portion 30 with a substantially cylindrical fluid passageway 32, and an annular flange portion 34 extending outwardly from cylindrical portion 30. Cylindrical portion 30 has a first cylindrical end welded to first tube 12, and a second cylindrical end adjacent second tubular member 18. Cylindrical portion 30 functions as a tube adaptor for coupling tube 12 to joint 10 and as a flow liner for partially covering seal 22. Second end 38 has an annular stop surface 40 formed thereon. Stop surface 40 is angled to face outwardly towards second tubular member 18. Stop surface 40 is preferably an annular spherical segment with its center positioned at center "A" of the flexible joint 10. Preferably, stop surface 40 is smooth and continuous. Of course, stop surface 40 can have a variety of shapes as needed or desired. Stop surface 40 prevents seal 22 from being crushed or otherwise damaged during assembly of flexible joint 10 by limiting axial relative movement between first and second tubular members 16 and 18. Annular flange portion 34 is preferably integrally formed with cylindrical portion 30 as a one-piece, unitary member. Annular flange portion 34 has a free end 42 which is rigidly coupled to outer restraining member 20. In particular, free end 42 of annular flange portion 34 is welded to outer restraining member 20 such that an annular space or cavity 44 is formed between first tubular member 16 and outer restraining member 20 for receiving seal 22 and a portion of second tubular member 18 therein.

As best seen in FIG. 4, annular flange portion 34 also includes an annular seating surface 46 for receiving and positioning seal 22 in the proper position and orientation on first tubular member 16. Seating surface 46 is also configured to form a first annular sealing surface which uniformly contacts a portion of seal 22 as discussed hereinafter. Preferably, seating or sealing surface 46 is a continuous, smooth conical surface with its center line or longitudinal axis coincident with the center lines or longitudinal axes of tubular members 16 and 18.

Referring now to second tubular member 18 which is in the form of a tube adaptor made of a rigid metallic material such as stainless steel, nickel alloy or titanium. Second tubular member 18 has a cylindrical portion 50 with a substantially cylindrical fluid passageway 52, and an annular flange portion 54 extending outwardly from cylindrical portion 50.

Cylindrical portion 50 has its axis or center line aligned with the axis or center line of cylindrical portion 30 of first tubular member 16 such that the second fluid passageway 52 of second tubular member 18 is substantially aligned with the first fluid passageway 32 of first tubular member 16. Cylindrical portion 50 has second tube 14 rigidly coupled at one end, and flange portion 54 rigidly coupled at its other end. In particular, second tube 14 is welded to cylindrical portion 50, while flange portion 54 is integrally formed with cylindrical portion 50 as a one-piece, unitary member.

As particularly seen in FIGS. 3 and 4, flange portion 54 is a spherical segment having an inwardly facing spherical surface 56 and an outwardly facing spherical surface 58. Both spherical surfaces 56 and 58 are substantially smooth, continuous, annular spherical segments with their centers located at center "A" of flexible joint 10. Inner spherical surface 56 functions as a sealing surface as well as a bearing surface, while outer spherical surface 58 functions as an outer bearing surface. Inner spherical surface 56 contacts and slidably engages a portion of seal 22 as discussed below such that first tubular member 16 and second tubular member 18 can angulate relative to each other as well as rotate relative to each other. More specifically, annular flange portion 54 of second tubular member 18 is movably restrained between seal 22 and outer restraining member 20 for both angular movement and rotational movement.

Preferably, a wear resistant coating is applied to inner and outer spherical surfaces 56 and 58 of flange portion 54 so as to resist abrasive and adhesive wear due to the metal-to-metal contact occurring between flange portion 54 and seal 22 as well as between flange portion 54 and outer restraining member 20. The wear resistant coating should not only prevent abrasive and adhesive wear, but should also exhibit reasonably low coefficients of friction at all temperatures to reduce the bending or torsional moments occurring during displacement of flexible joint 10 from high pressure loads. These pressure loads are the product of the differential pressure and the maximum effective projected sealing area of the flexible joint 10, and can amount to several thousand pounds of force. One suitable wear resistant coating for use in very high temperature applications is TRIBOGLIDE® which was developed by EG&G Pressure Science, Inc. and licensed to its thermal spray vendors. TRIBOGLIDE® comprises a chromium-carbide, nichrome matrix throughout which calcium-barium fluoride solid lubricant particles are dispersed.

Turning now to outer restraining member 20 which is made of a rigid metallic material such as nickel alloy, stainless steel or titanium, and includes a first annular ring portion 60 and a second annular ring portion 62 integrally formed with first annular ring portion 60 as a one-piece, unitary member. First ring portion 60 is substantially cylindrical with its first end rigidly coupled to free end 42 of annular flange portion 34 of first tubular member 16, and its other end integrally formed with second ring portion 62. Ring portion 62 extends inwardly from first ring portion 60, and has an inwardly facing spherical surface 64 for contacting and slidably engaging annular flange portion 54 of second tubular member 18. Spherical surface 64 is preferably substantially, smooth, a continuous spherical segment with its center located at center "A" of flexible joint 10. Spherical surface 64 is in sliding contact with outer spherical surface 58 of second tubular member 18. Thus, spherical surface 64 of outer restraining member 20 functions as an inwardly facing bearing surface for controlling angular and rotational movement of second tubular member relative to first tubular member 16. Spherical surface 64 can be coated with a wear resistant coating such as TRIBOGLIDE®. Of course, if spherical surface 64 is coated with a wear resistant coating, then it would not be necessary to coat outer spherical surface 58 of second tubular member 18.

Figure 5:
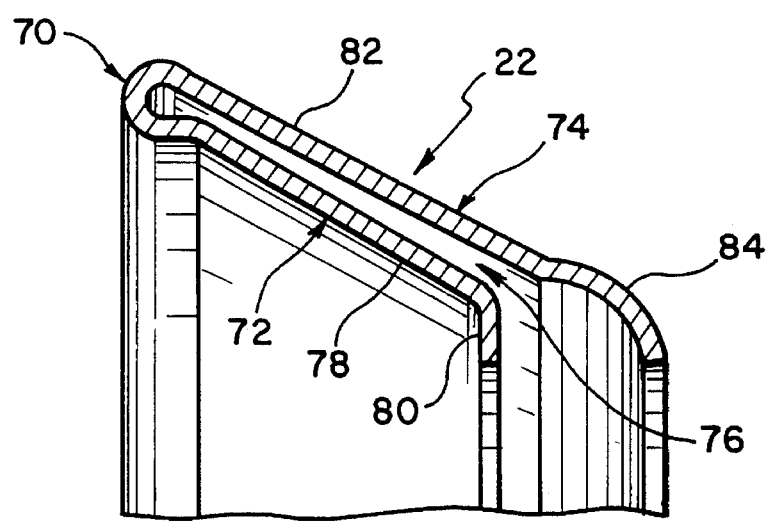
FIG. 5 is an enlarged, partial side elevational view of the conical pressure-energized seal utilized in the flexible joint illustrated in FIGS. 1–4.

Referring now to FIGS. 4 and 5, seal 22 is a conically shaped pressure-energizable seal constructed of a thin, resilient, high-temperature metallic foil having a thickness of about 0.012 inch. For example, seal 22 can be manufactured from a thin foil having high strength as well as high temperature mechanical properties and oxidation resistance such as a nickel-based superalloy, Inconel, Waspaloy, Rene' 41, precipitation hardenable stainless steel, or a new titanium alloy. Seal 22 is somewhat resilient and compliant so as to conform to the shape of the sealing surfaces 46 and 56 of tubular members 16 and 18, respectively. In other words, seal 22 can conform to any small deviations existing in sealing surfaces 46 and 56. Seal 22 includes an annular bight 70, a first or inner annular leg 72 and a second or outer annular leg 74.

Bight 70 is preferably circular as viewed along its longitudinal axis. However, bight 70 can be out of round, e.g., elliptical, so as to form an interference fit with annular flange 34 of first tubular member 16. In other words, seal 22 can be frictionally retained on first tubular member 16 due to the resiliency of seal 22 exerting a force onto first tubular member 16, the reaction to which tends to restore seal 22 from its distorted out of round shape back to a circular shape. Bight 70 has a substantially C-shaped longitudinal cross-section with inner leg 72 extending from one end of bight 70 and outer leg 74 extending from the other end of bight 70 so as to form an annular space 76 between inner leg 72 and outer leg 74.

Legs 72 and 74 are both substantially conically shaped. Legs 72 and 74 of seal 22 are capable of conforming to the shapes of the sealing surface 46 of first tubular member 16 and the inwardly facing sealing surface 56 of second tubular member 18. Specifically, legs 72 and 74 conform to sealing surfaces 46 and 56 due to the pressure-energization from the pressurized fluid running through tubes 12 and 14. In other words, the pressure on the inside surfaces of seal 22 is higher than the pressure on the outside surfaces of seal 22 such that the pressure from the pressurized system is distributed over the interior surfaces of the seal 22 to create a ballooning effect and swelling the seal cross-section to increase its sealing contacts of legs 72 and 74 force against sealing surfaces 46 and 56.

This pressure energization of seal 22 at least partially offsets the effect of higher pressures which tend to cause higher leakages because of the presence of unavoidable microscopic gaps between the sealing surfaces. Thus, pressure energization tends to prevent an increase in the area of these gaps, and thereby minimizing the increased leakage with increasing pressures in the fluid.

As seen in FIG. 5, inner leg 72 includes a first conical portion 78 extending inwardly from bight 70, and a second ring portion 80 extending inwardly from first conical portion 78. First conical portion 78 has a substantially flat, planar longitudinal cross-section which corresponds substantially to the conically shaped sealing surface 46 of first tubular member 16. Second ring portion 80 extends substantially perpendicular to the longitudinal axis of first tubular member 16.

Outer leg 74 includes a conical portion 82 extending inwardly from bight 70, and a curved ring portion 84 extending from conical portion 82. Conical portion 82 has a substantially flat, planar longitudinal cross-section, and extends between bight 70 and curved ring portion 84. Conical portion 82 diverges away from inner leg 72 as it extends away from bight 70 in its preassembled condition. Curved ring portion 84 is concaved outwardly and forms an annular seal against sealing surface 56 of second tubular member 18. Outer leg 74 along with a portion of bight 70 can be coated with a wear resistant coating such as TRI-BOGLIDE® to reduce abrasive wear between seal 22 and sealing surface 56 as first and second tubular members 16 and 18 angulate or rotate relative to each other. Of course, if a wear resistant coating is applied to outer leg 74 of seal 22, then it may not be necessary to coat inner spherical surface 56 of second tubular member 18, depending on the type of coating material utilized.

Assembly and Operation

Flexible joint 10 is assembled by first installing pressure-energized seal 22 onto annular flange portion 34 of first tubular member 16. In particular, inner leg 72 of seal 22 is seated onto annular sealing surface 46 such that substantial uniform contact is obtained between sealing surface 46 and conical portion 78 of inner leg 72 of seal 22.

Next, second tubular member 18 is positioned over first tubular member 16 and seal 22 such that annular flange portion 54 of second tubular member 18 engages outer leg 74 of seal 22. Annular flange portion 54 of second tubular member 18 engages and slightly compresses or deforms seal 22 so that outer leg 74 moves closer towards inner leg 72. Stop surface 40 of first tubular member 16 limits the relative movement of second tubular member 18 relative to first tubular member 16 so that seal 22 is not crushed or permanently damaged. Also stop surface 40 ensures that annular space 76 between legs 72 and 74 of seal 22 does not completely collapse.

Finally, outer restraining member 20 is installed over second tubular member 18 and secured to first tubular member 16 such that second ring portion 62 engages annular flange portion 54 of second tubular member and first ring portion 60 engages annular flange portion 34 of first tubular member 16. In particular, first ring portion 60 of outer restraining member 20 is welded to free end 42 of annular flange portion 34 of first tubular member 16 to complete the assembly of flexible joint 10. Accordingly, outer restraining member 20 is now rigidly coupled to first tubular member 16 and movably restrains second tubular member 18 relative to first tubular member 16 for angular and rotational movements.

In the assembled position, seal 22 undergoes a slight plastic deformation such that outer leg 74 is moved slightly closer to inner leg 72. Of course, annular space 76 is still maintained between inner leg 72 and outer leg 74 so that the seal 22 can be pressure-energized by the pressurized fluid flowing through tubes 12 and 14. Also, the annular space 44 between annular flange portion 34 of first tubular member 16 and outer restraining member 20 is sized to accommodate both seal 22 and flange portion 54 of second tubular member so that a gap 86 is formed between stop surface 40 and inner spherical surface 56 of flange portion 54 so that the pressurized fluid can readily flow therebetween and pressure-energize seal 22.

In operation, the pressurized fluid flowing through tubes 12 and 14 flows into annular space 44 via gap 86 to pressure-energize seal 22. In particular, the pressurized fluid flows into the space 76 between inner and outer legs 72 and 74 of seal 22 so as to exert a uniform pressure along the interior surfaces of seal 22. Thus, seal 22 is pressed against sealing surfaces 46 and 56. More specifically, conical portion 78 of inner leg 72 is pressed against sealing surface 46, while curved ring portion 84 of outer leg 74 is pressed up against sealing and bearing surface 56. Accordingly, seal 22 conforms to sealing surfaces 46 and 56 to close any microscopic gaps therebetween. Also, as pressure in the fluid increases, the pressure-energization of seal 22 also increases to minimize leakage from flexible joint 10.

In the assembled position, flexible joint 10 permits tubes 12 and 14 to undergo relative rotational movement and angular movement, but not axial movement. Thus, tubes 12 and 14 can be angularly misaligned as shown in FIG. 2 in which the misalignment is defined between the center lines of the tubes 12 and 14. Advantageously, the angular misalignment can be about ±5° between the center lines. This misalignment can be caused by numerous factors, including thermal expansion and contraction, dimensional tolerances and mechanical deflections being placed on the tubes.

As seen in FIG. 2, the center lines of tubes 12 and 14 have their intersection at center point "A" because of the spherical segments or surfaces of second tubular member 18 and outer restraining member 20 as well as pressure-energized seal 22, joint 10 provides for limited angular movement and complete rotational movement.

Figure 6:
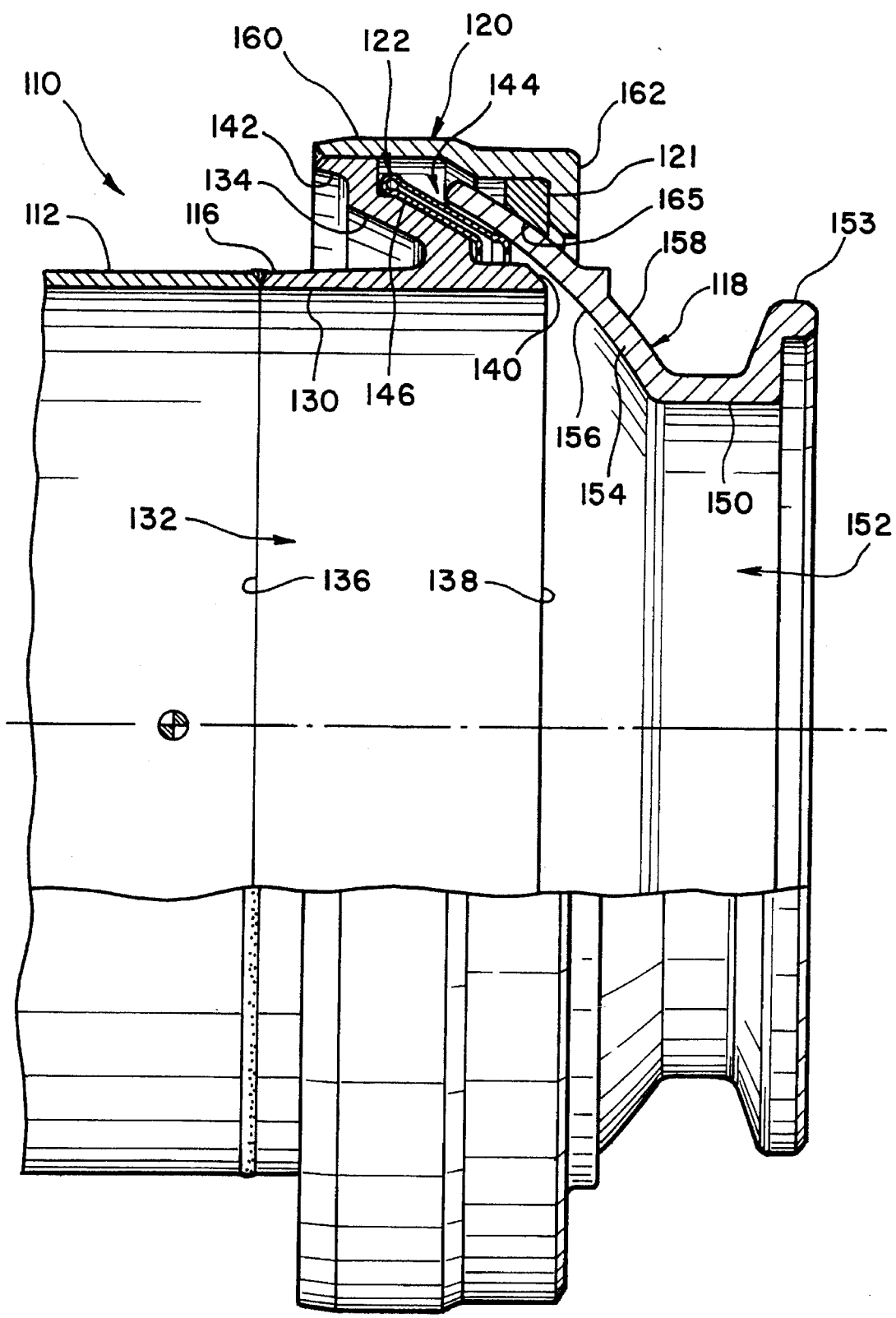
FIG. 6 is a side elevational view in partial longitudinal section of a flexible pressure-energized joint in accordance with a second embodiment of the present invention coupling a pair of conduits or tubes together with these tubes having their center lines aligned in which the joint forms a reducing section of a conduit.
Figure 7:
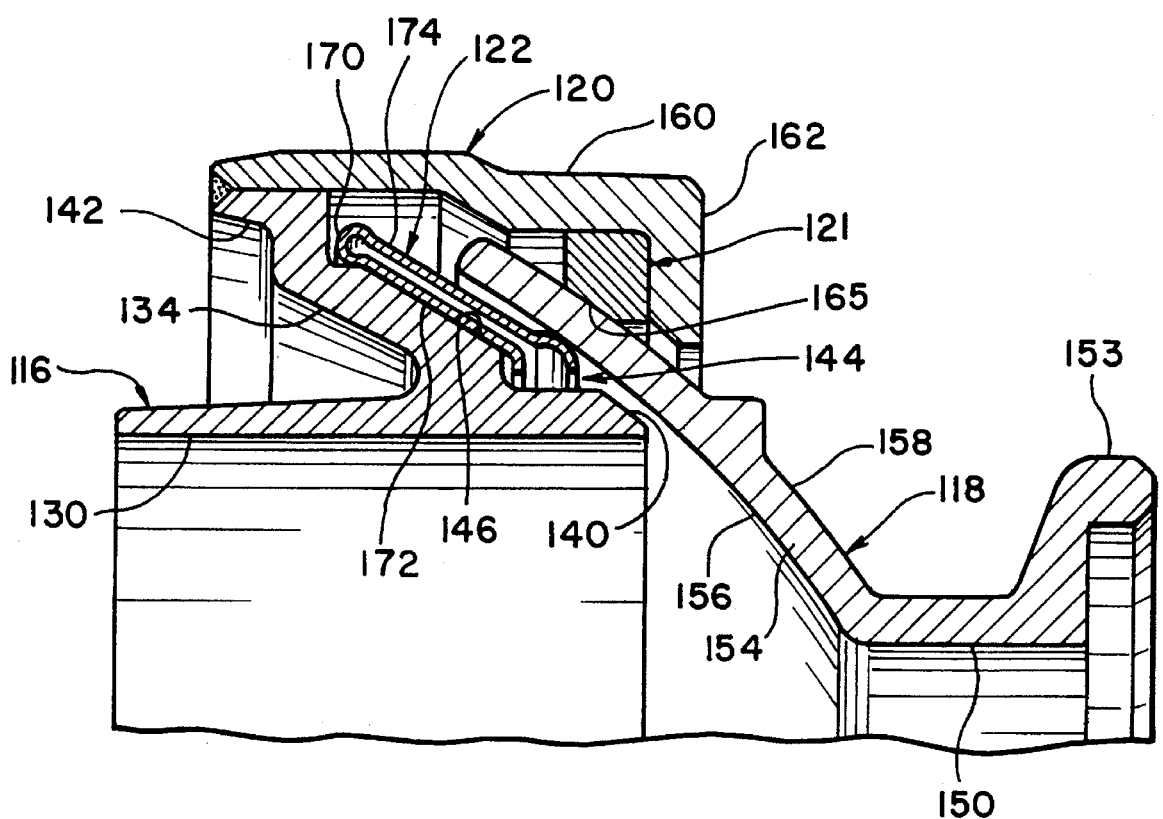
FIG. 7 is an enlarged, partial side elevational view of the flexible pressure-energized joint illustrated in FIG. 6.

Embodiment of FIGS. 6 and 7

A modified flexible joint 110 in accordance with a second embodiment of the present invention is illustrated in FIGS. 6 and 7. Flexible joint 110 is designed for more moderate temperature applications than flexible joint 10, and includes a first tubular member 116, a second tubular member 118, an outer restraining member 120, a bearing ring 121 and a pressure-energized seal 122.

As seen in FIGS. 1 and 6, the main differences between flexible joint 110 and flexible joint 10, discussed above, is that second tubular member 118 has been modified to be a tube reducing flange and outer restraining member 120 has been modified to accommodate the addition of bearing ring 121. Accordingly, flexible joint 110 will not be discussed in detail, but rather only the differences between flexible joint 110 and flexible joint 110 will be discussed in detail herein.

Referring now to FIGS. 6 and 7, first tubular member 116 is in the form of a tube adaptor for rigidly coupling first tube 112 by welding or the like to flexible joint 10. First tubular member 116 includes a substantially cylindrical portion 130 with a substantially cylindrical fluid passageway 132, and an annular flange portion 134 extending outwardly from cylindrical portion 130.

Cylindrical portion 130 has a first cylindrical end 136 welded to first tube 112, and a second cylindrical end 138 adjacent second tubular member 118. Second end 138 has an annular stop surface 140 formed thereon. Stop surface 140 is angled to face outwardly towards second tubular member 118 to limit axial relative movement between first and second tubular members 116 and 118 to prevent seal 122 from being crushed or otherwise damaged during assembly.

Annular flange portion 134 is preferably integrally formed with cylindrical portion 130 as a one-piece, unitary member. Annular flange portion 134 has a free end 142 which is welded to outer restraining member 120 to form an annular space or cavity 144 between first tubular member 116 and outer restraining member 120 for receiving seal 122 and a portion of second tubular member 118 therein.

Annular flange portion 134 also includes an annular seating surface 146 for receiving and positioning seal 122 in its proper position and orientation on first tubular member 116. Seating surface 146 is also configured to form a first annular sealing surface which uniformly contacts a portion of seal 122. Preferably, seating or sealing surface 146 is a continuous, smooth conical surface with its center line or longitudinal axis coincident with the center lines or longitudinal axis of tubular members 116 and 118.

Second tubular member 118 includes a cylindrical portion 150 with a substantially cylindrical fluid passageway 152, a first annular flange portion 153 extending outwardly from one end of cylindrical portion 150 for coupling a second flange and tube (not shown) thereto via a coupling member (not shown) in a conventional manner, and a second annular flange 154 extending outwardly from the other end of cylindrical portion 150.

Cylindrical portion 150 has its axis or center line aligned with the axis or center line of first tubular member 116 such that the first and second fluid passageways 132 and 152 are substantially aligned. However, cylindrical portion 150 has a smaller diameter than the diameter of cylindrical 130 of first tubular member 116 such that flexible joint 110 also acts as a reducing joint for coupling a larger tube or conduit to a smaller tube or conduit.

First annular flange portion 153 is adapted to be releasably coupled to a tube or conduit by a coupling member or apparatus such as the one disclosed in U.S. Pat. No. 3,797,836, issued on Mar. 19, 1994 to Horace P. Halling, the disclosure of which is hereby incorporated herein be reference.

Flange portion 154 is a spherical segment having an inwardly facing spherical surface 156 and an outwardly facing spherical surface 158. Both spherical surfaces 156 and 158 are substantially smooth, continuous annular spherical segments with their centers located at center "A" of flexible joint 110. Inner spherical surface 156 functions as a sealing surface as well as a bearing surface, while outer spherical surface 158 functions as an outer bearing surface for slidably engaging bearing ring 121. Inner spherical surface 156 contacts and slidably engages a portion of seal 122 in the same manner as discussed above with respect to the first embodiment so that first tubular member 116 and second tubular member 118 can angulate relative to each other as well as rotate relative to each other. More specifically, annular flange portion 154 of second tubular member 118 is movably constrained between seal 122 and bearing ring 121 of outer restraining member 120 for both angular movement and rotational movement.

Preferably, a wear resistant coating is applied to inner and outer spherical surfaces 156 and 158 of flange portion 150 so as to resist abrasive layer due to the metal-to-metal contact occurring between flange portion 154 and seal 122 as well as between flange portion 154 and bearing ring 121 of outer restraining member 120.

Turning now to outer restraining member 120, which is made of a rigid metallic material and includes a first annular ring portion 160, and a second annular ring portion 162 integrally formed with first annular ring portion 160 as a one-piece, unitary member. First ring portion 160 is substantially cylindrical with its first end rigidly coupled to free end 142 of annular flange 134 of first tubular member 116 and its other end integrally formed with second ring portion 162. Ring portion 162 extends substantially perpendicularly and inwardly from first ring portion 160 to form an annular flange seat 164 for receiving and carrying bearing ring 121.

Bearing ring 121 is preferably, a shrink-fitted carbon-graphite ring. Of course, other types of bearing rings may be utilized as needed or desired which functions in substantially the same way. Bearing ring 121 is positioned between outer restraining member 120 and annular flange 154, and includes a spherical bearing surface 165 in sliding contact with outer spherical surface 158 of second tubular member 118. Spherical sealing surface 164 is preferably a substantially smooth, continuous spherical segment with its center located at center "A" of flexible joint 110. Thus, spherical surface 164 of bearing ring functions as an inwardly facing bearing surface for controlling angular and rotational movement of second tubular member 118 relative to first tubular member 116.

Seal 122 is a conically shaped pressure-energizable seal constructed of a thin metallic foil. Seal 122 includes an annular bight 170, a first through inner annular leg 172 and a second or outer annular leg 174. Seal 122 is substantially identical to seal 122 discussed above in respect to the first embodiment. Thus, seal 122 will not be further discussed in detail herein.

Figure 8:
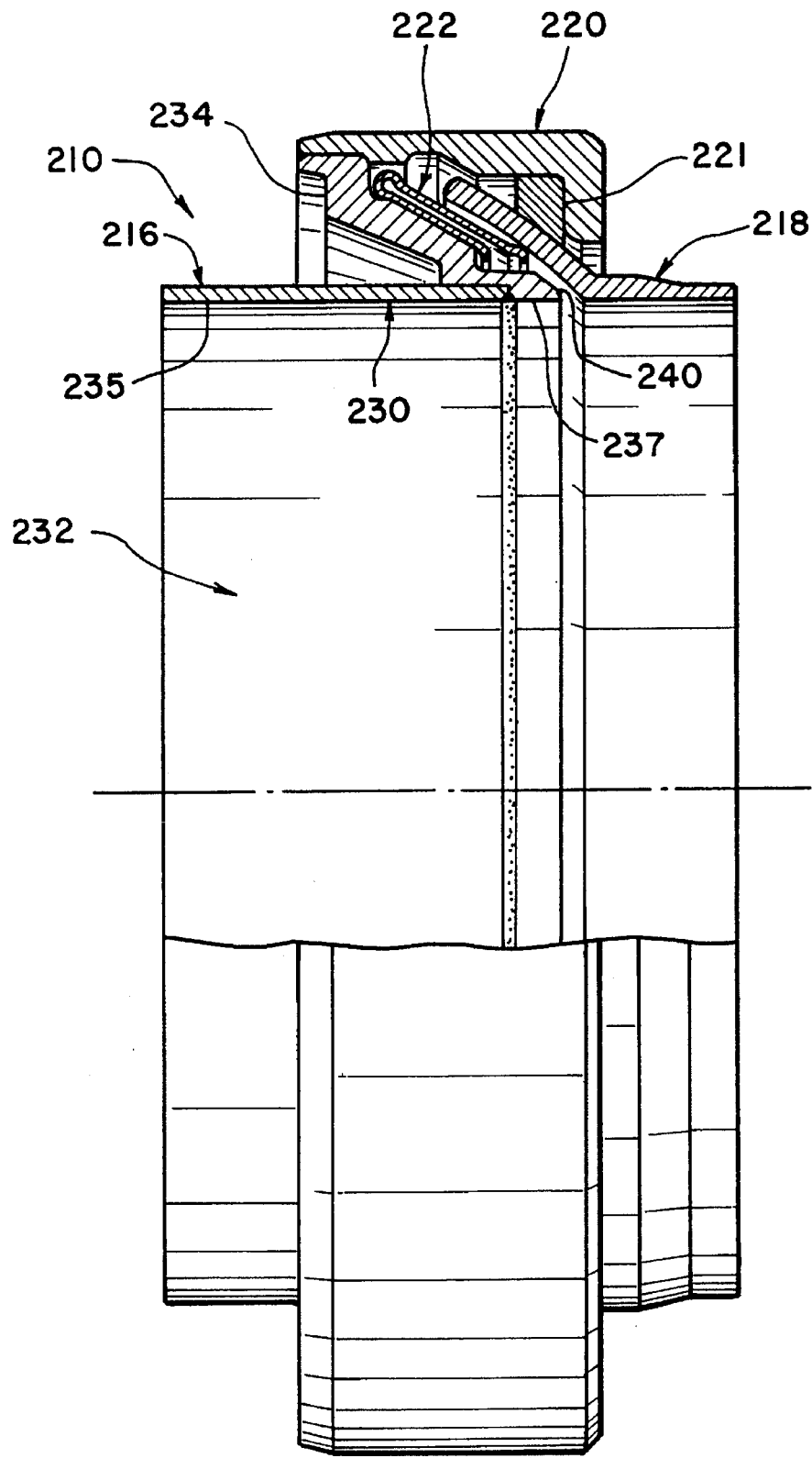
FIG. 8 is a side elevational view in partial longitudinal section of a flexible pressure-energized joint in accordance with a third embodiment of the present invention coupling a pair of conduits or tubes together with these tubes having their center lines aligned.

Embodiment of FIG. 8

A modified flexible joint 210 in accordance with a third embodiment of the present invention is illustrated in FIG. 8. Flexible Joint 210 includes a first tubular member 216, a second tubular member 218, an outer restraining member 220, a bearing ring 221 and a pressure-energized seal 222.

Flexible joint 210 is designed for coupling two tubes or conduits (not shown) together which have substantially the same size diameters. In particular, first and second tubular members 216 and 218 are formed as tube adaptors for rigidly coupling tubes thereto by welding.

As seen in FIGS. 1, 6 and 8, flexible joint 210 is a hybrid of flexible Joint 10 and flexible joint 110, as discussed above. Also, first tubular member 216 has been constructed of two elements welded together as opposed to a single unitary, one-piece member as in flexible joints 10 and 110. Accordingly, flexible joint 210 will not be discussed in detail herein.

First tubular member 216 includes a substantially cylindrical portion 230 with a substantially cylindrical fluid passageway 232, and an annular flange portion 234 extending outwardly from cylindrical portion 230. Cylindrical portion 230 is constructed of two pieces. In particular, cylindrical portion 230 has a first tubular section 235 in the form of a tube adaptor and a second tubular section 237 in the form of a flow liner with an annular stop surface 240. First and second tubular sections 235 and 237 are preferably rigidly coupled together by welding or any other suitable means.

Second tubular member 218, outer restraining member 220, bearing ring 221 and seal 222 are all substantially identical to their respective parts of flexible joint 110. Thus, these parts of flexible joint 210 will not be discussed in further detail herein.

Figure 9:
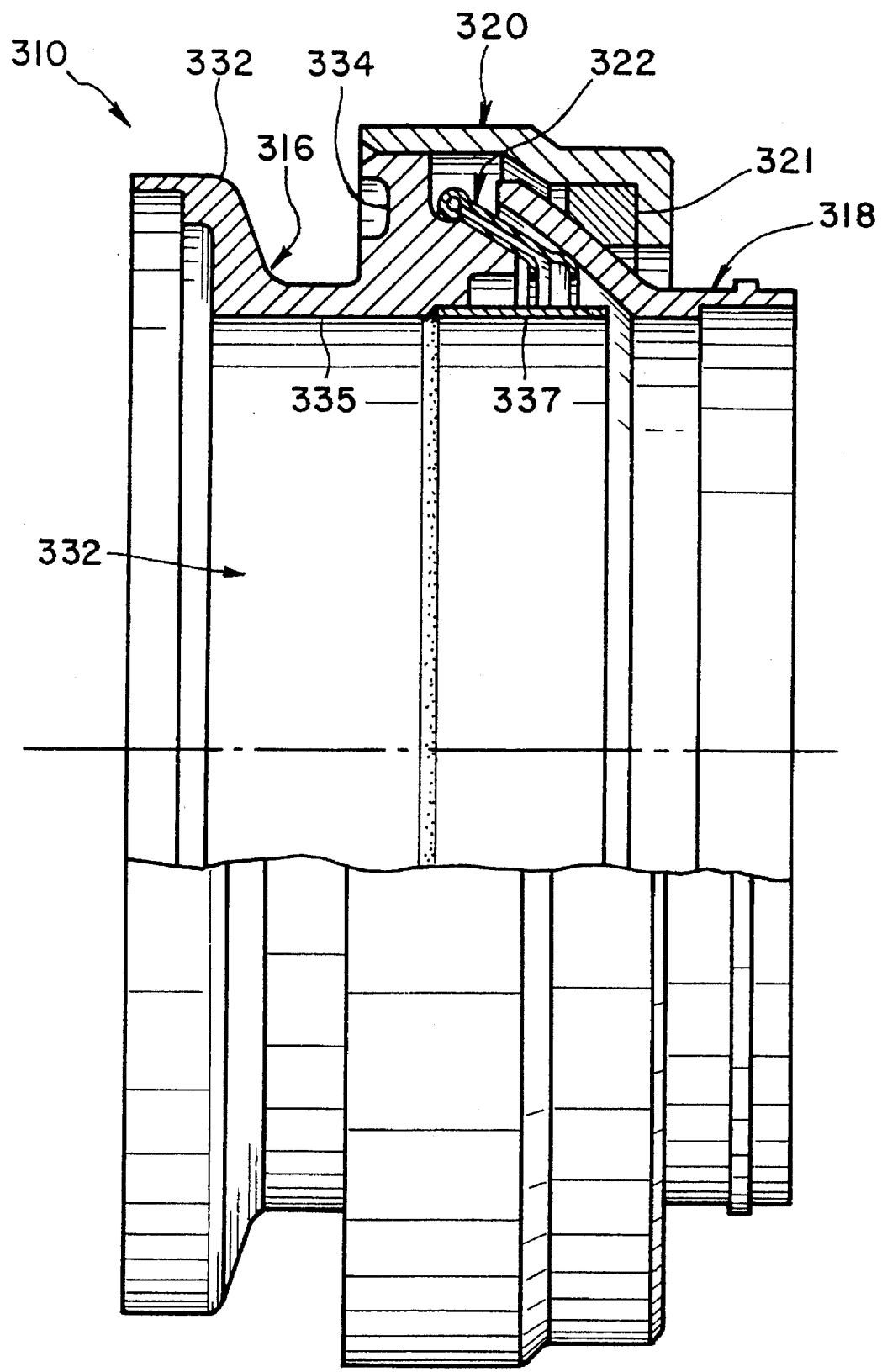
FIG. 9 is a side elevational view in partial longitudinal section of a flexible pressure-energized joint in accordance with a fourth embodiment of the present invention coupling a pair of conduits or tubes together with these tubes having their center lines aligned.

Embodiment of FIG. 9

A modified flexible joint 310 in accordance with a fourth embodiment of the present invention is illustrated in FIG. 9. Flexible joint 310 includes a first tubular member 316, a second tubular member 318, an outer restraining member 320, a bearing ring 321 and a pressure-energized seal 322.

Flexible joint 310 is a modified version of the prior flexible joint discussed above. Accordingly, flexible joint 310 will not be discussed in detail, but rather, only the differences between flexible joint 310 and the flexible joints discussed above will be discussed herein.

In this embodiment, first tubular member 316 has been modified so that first tubular member 316 includes a two-piece, substantially cylindrical portion 330 with a substantially cylindrical fluid passageway 332, a first annular flange 333 extending outwardly from one end of cylindrical portion 330, and a second annular flange portion 334 extending outwardly from the mid-point of cylindrical portion 330.

Cylindrical portion 330 includes a first tubular section 355 having first and second annular flange portions 333 and 334 integrally formed therewith as a one-piece unitary member, and a second tubular section 337 in the form of a flow liner. Second tubular section 337 is preferably welded to first tubular section 335 so as to rigidly couple first and second tubular sections 335 and 337 together.

First annular flange portion 333 is adapted to be coupled to a conduit or tube via a conventional coupling member (not shown) such as the coupling member disclosed in U.S. Pat. No. 3,797,836, issued on Mar. 19, 1994 to Horace P. Halling.

Second tubular member 318, outer restraining member 320, bearing ring 321 and seal 322 are all substantially identical to their respective parts of flexible joint 110. Thus, these parts of flexible joint 310 will not be discussed in further detail herein.

Figure 10:
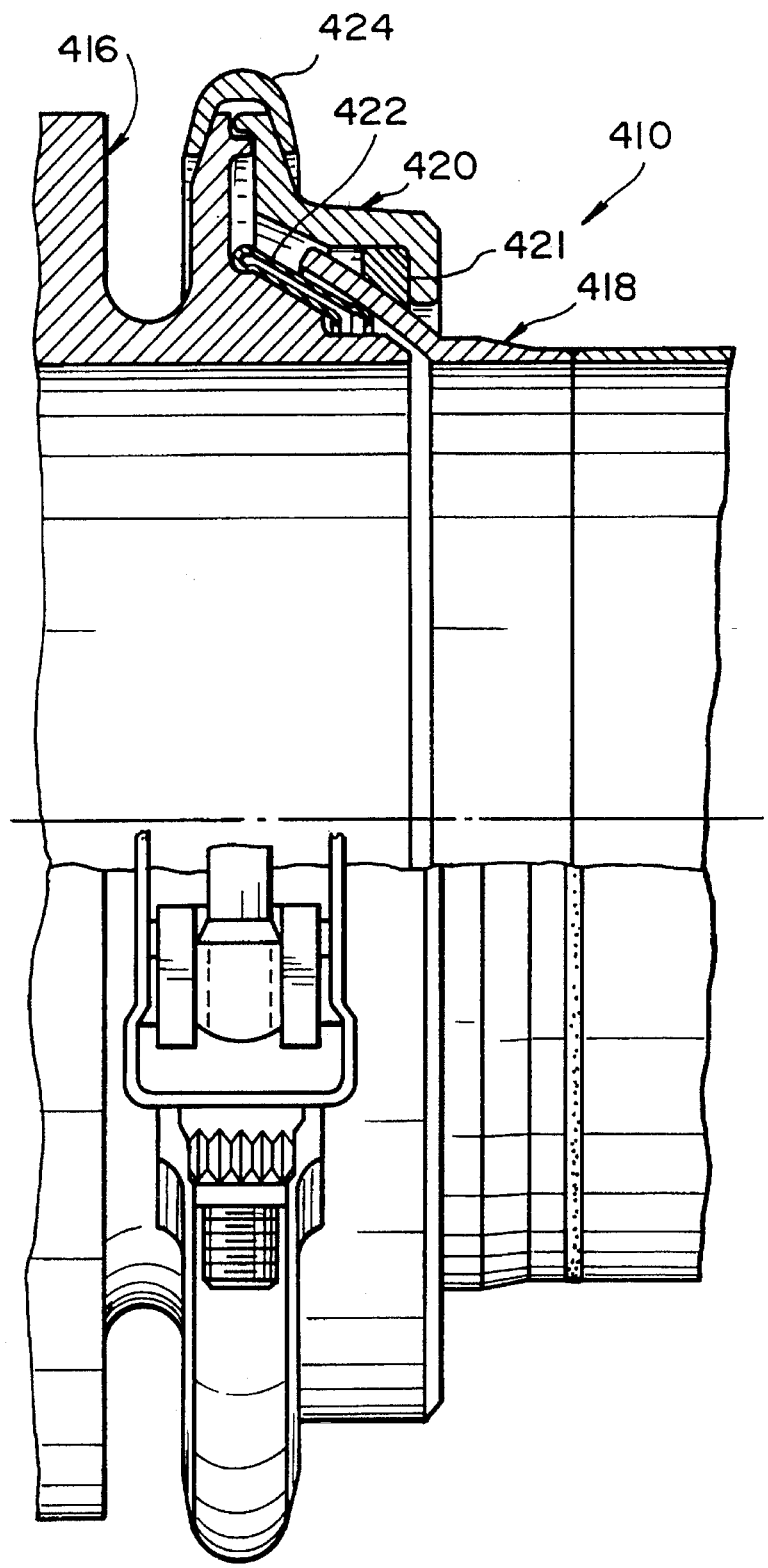
FIG. 10 is a side elevational view in partial longitudinal section of a separable, flexible pressure-energized joint in accordance with a fifth embodiment of the present invention coupling a flow device such as a valve to a conduit or tube having their center lines aligned.

Embodiment of FIG. 10

A modified flexible joint 410 in accordance with a fifth embodiment of the present invention is illustrated in FIG. 10. Flexible joint 410 includes a first tubular member 416, a second tubular member 418, an outer restraining member 420, a bearing ring 421, a pressure-energized seal 422 and a coupling member 424. Flexible joint 410 is a modified version of the prior flexible joints discussed above. Accordingly, flexible joint 410 will not be discussed in detail, but rather only the differences between flexible joint 410 and the previously discussed joints will be discussed herein.

In particular, first tubular member 416 is formed integrally with a fluid flow device or valve mechanism rather than to a conduit. Accordingly, flexible joint 410 in this embodiment couples a conduit 414 to a flow device 412. Also, in this embodiment, outer restraining member 422 is releasably coupled to first tubular member 416 by a coupling member 424. Coupling member 424 is a conventional coupling member such as the one disclosed in U.S. Pat. No. 3,797,836, issued on Mar. 19, 1994 to Horace P. Halling.

Figure 11:
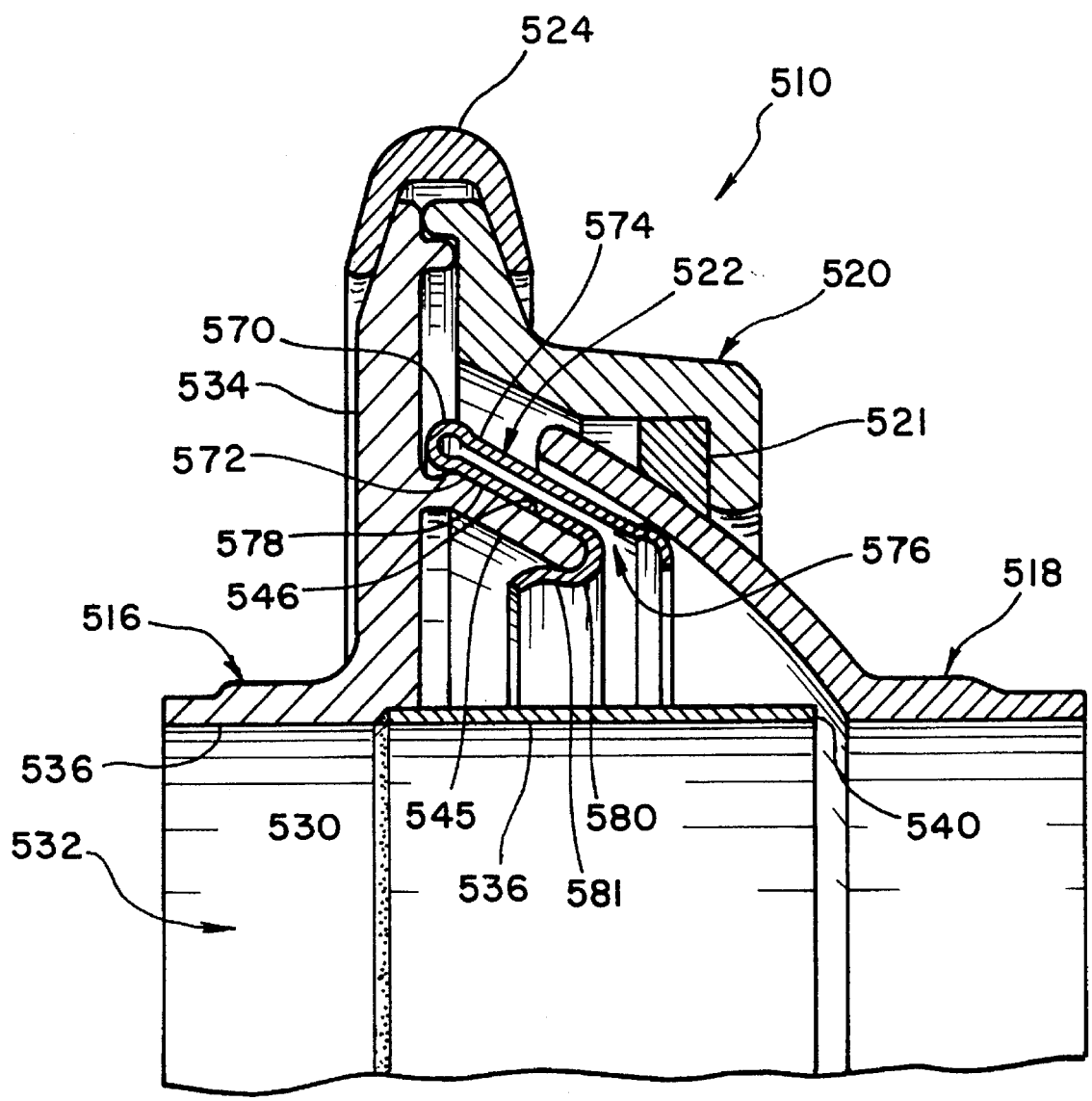
FIG. 11 is an enlarged partial side elevational view in longitudinal section of a separable, flexible pressure-energized joint in accordance with a sixth embodiment of the present invention.

Embodiment of FIG. 11

A modified flexible joint 510 in accordance with a sixth embodiment of the present invention is illustrated in FIG. 11. Flexible joint 510 includes a first tubular member 516, a second tubular member 518, an outer restraining member 520, a bearing ring 521, a pressure-energized seal 522 and a coupling member 524. Flexible joint 510 is designed to couple two tubes or conduits (not shown) together in which the tubes are substantially the same size in diameter.

Referring to FIGS. 10 and 11, flexible joint 510 is substantially identical to flexible joint 410, discussed above, except that first tubular member 516 and pressure-energized seal 522 have been slightly modified. Accordingly, flexible joint 510 will not be discussed in detail, but rather, only the differences between flexible joint 510 and flexible joint 410 will be discussed herein.

First tubular member 516 is in the form of a tube adaptor for rigidly coupling a tube (not shown) thereto by welding or the like. First tubular member 516 includes a two-piece, substantially cylindrical portion 530 with a substantially cylindrical fluid passageway 532, and an annular flange portion 534 extending outwardly from cylindrical portion 530.

Cylindrical portion 530 includes a first tubular section 536 in the form of a tube adaptor adapted to be welded to a first tube, and a second tubular section 538 in the form of a flow liner which is welded to first tubular section 536. Second tubular section 538 has an annular stop surface 540 formed thereon for limiting axial movement between first and second tubular members 516 and 518.

Annular flange portion 534 is preferably integrally formed with first tubular section 536 of cylindrical portion 530 as a one-piece, unitary member. Annular flange portion 534 has a free end adapted to receive coupling member 524 for coupling first tubular member 516 to outer restraining member 520. Annular flange portion 534 also has a conical flange 545 with an annular, conical seating and sealing surface 546 for receiving and positioning seal 522 in the proper position and orientation on first tubular member 516. Seating and sealing surface 546 is configured to form a first annular sealing surface which uniformly contacts a portion of seal 522 as discussed hereinafter. Preferably, seating and sealing surface 546 is a continuous, smooth conical surface with its center line or longitudinal axis coincident with the center line or longitudinal axis of first tubular member 516.

Referring now to seal 522, which is substantially identical to seal 22, except that seal 522 has been modified to provide an interference fit between first tubular member 516 and seal 522. Seal 522 includes an annular bight portion 570, a first or inner annular leg 572 and a second or outer annular leg 574.

Bight 570 has a substantially C-shaped in longitudinal cross-section with inner leg 572 extending from one end of bight 570, and outer leg 574 extending from the other end of bight 570 so as to form an annular space 576 between inner legs 572 and outer legs 574. Bight 570 is preferably circular as viewed along its longitudinal axis.

Inner leg 572 includes a first conical portion 578 extending inwardly from bight 570, connecting portion 580 extending inwardly from first conical portion 578, and a third ring portion 581 extending substantially parallel to the longitudinal axis of first tubular member 516. First conical portion 578 has a substantially flat, planar longitudinal cross-section which corresponds substantially to the conical shaped sealing surface 546 of first tubular member 516. Second connecting portion 580 has a substantially curved shaped in longitudinal cross-section for interconnecting first conical portion 578 with third ring portion 581. Third ring portion 581 extends substantially parallel to the longitudinal axis of first tubular member 516, and has an outwardly concaved longitudinal cross-section. Preferably, third ring portion 581 is out of round, e.g., elliptical, as viewed along the longitudinal axis of first tubular member 516 so as to provide an interference fit between flange 545 of first tubular member 516 and seal 522. In other words, ring portion 581 is, for example, elliptical in shape as viewed along the longitudinal axis of first tubular member 516. Accordingly, when seal 522 is coupled to tubular member 516, ring portion 581 is distorted from its out of round condition to a round or circular condition to secure seal 522 to first tubular member 516. Ring portion 581 then applies a force on the end of flange 544 due to the resiliency in seal 522 which tends to restore ring portion 581 from its round or circular condition back to its out of round or elliptical condition. Thus, seal 522 is frictionally retained on first tubular member 516.

Figure 12:
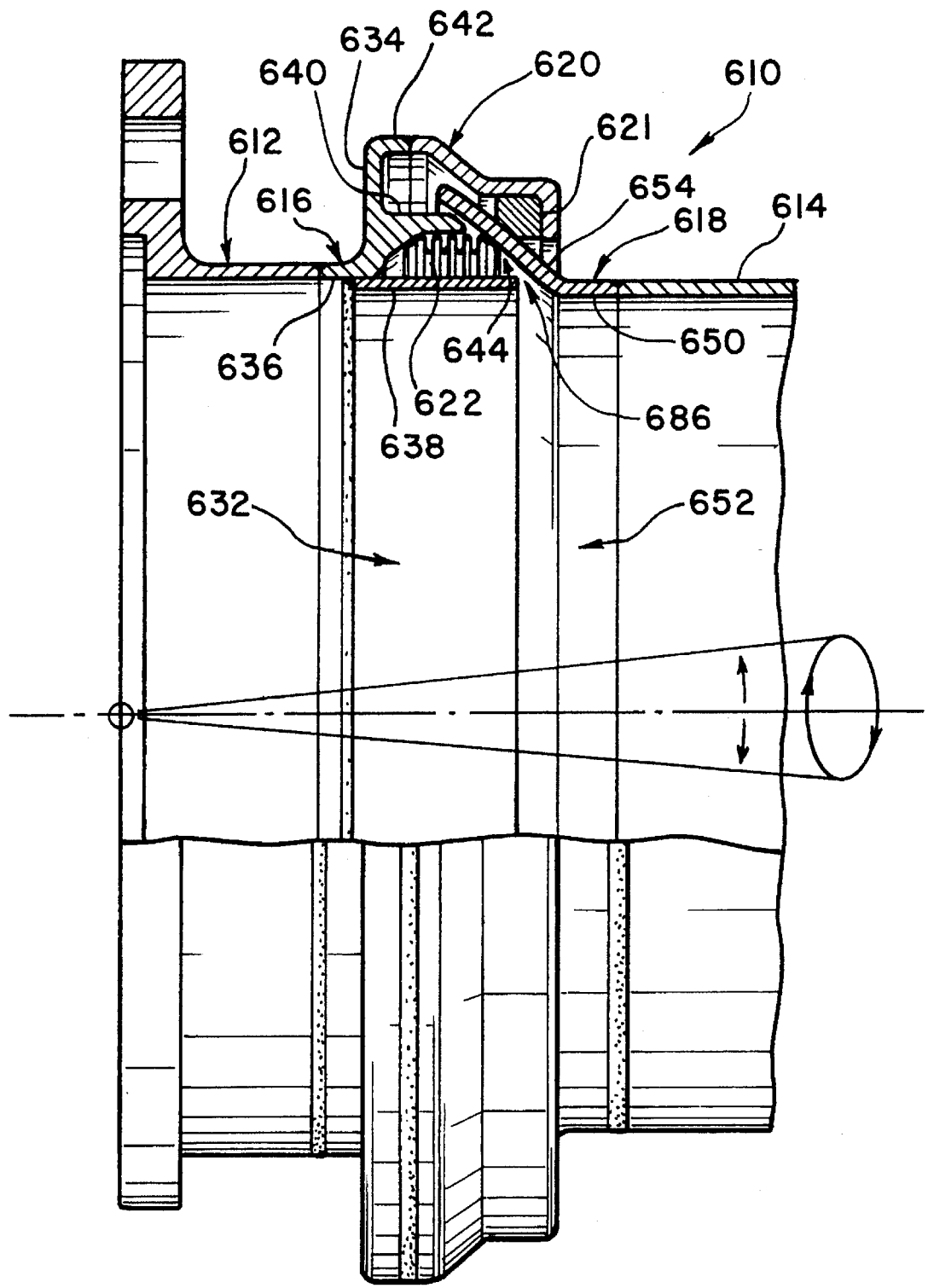
FIG. 12 is a side elevational view in partial longitudinal section of a flexible pressure-energized joint in accordance with a seventh embodiment of the present invention coupling a pair of conduits or tubes together with these tubes having their center lines aligned.
Figure 13:
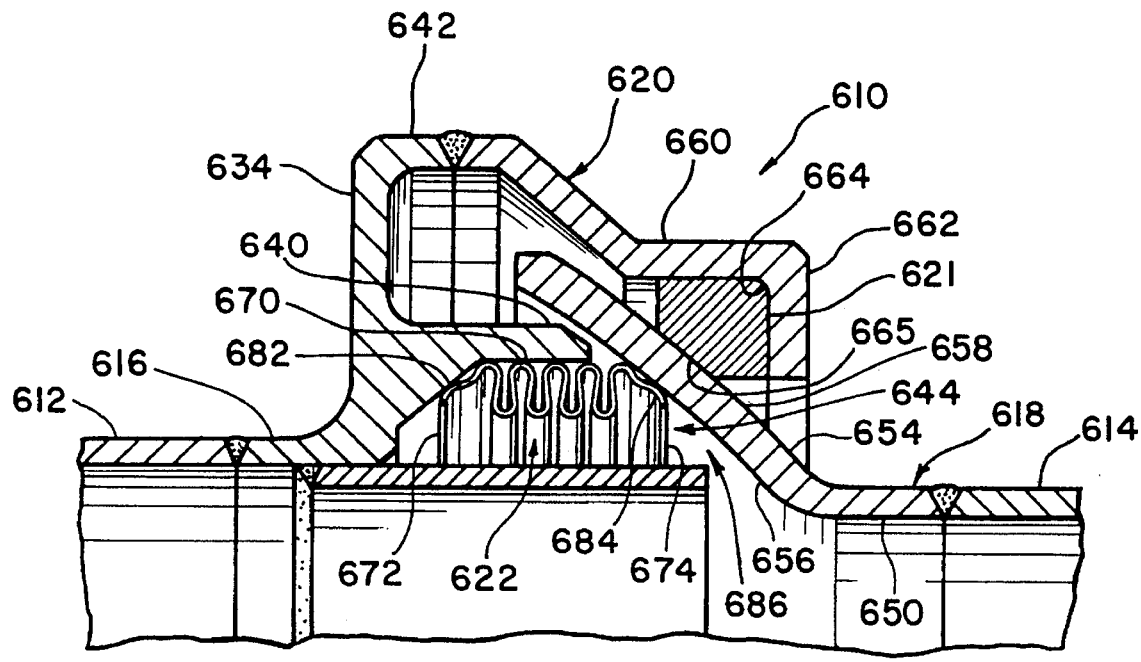
FIG. 13 is an enlarged, partial side elevational view of the flexible pressure-energized joint illustrated in FIG. 12.

Embodiment of FIGS. 12 and 13

A modified flexible joint 610 in accordance with a seventh embodiment of the present is illustrated in FIGS. 12 and 13. Flexible joint 610 includes a first tubular member 616, a second tubular member 618, an outer restraining member 620, a bearing ring 621 and a pressure-energized seal 622. Flexible joint 610 is designed to couple a flanged tube 612 to a tube or conduit 614. Flanged tube 612 and tube 614 are conventional, and therefore will not be discussed in detail.

As seen in FIG. 12, flexible joint 610 can be angulated about its spherical center by angulating the axis of one of the tubular members 616 or 618 relative to the axis or center line of the other of the tubular members, the contact pressures between seal 622 and the first and second tubular members 616 and 618 remain substantially constant. Likewise, the contact pressures between seal 622 and tubular members 616 and 618 remain constant when one of the tubular members 616 or 618 is rotated relative to the other tubular member 616 or 618. Preferably, flexible joint 610 can angulate approximately ±5°.

Flexible joint 610 can accommodate slight deflections of the components which occur under normal operating conditions such as from thermal expansion, structural deflections and tolerance accumulations. These slight deflections often lead to small deviations in the sealing surfaces from their spherical forms. Seal 622 accommodates these deviations by deflections of seal 622, which is capable of conforming to the changed shape of the mating components due to its resiliency and compliancy, as discussed more particularly hereinafter.

First tubular member 616 is in the form of a tube adaptor for rigidly coupling flanged tube 612 thereto by welding or the like. First tubular member 616 is made from a rigid metallic material such as stainless steel or titanium. First tubular member 616 includes a substantially cylindrical portion 630 with a substantially cylindrical fluid passageway 632, and an annular flange portion 634 extending outwardly from cylindrical portion 630. Cylindrical portion 630 has a first tubular section 636 welded to flanged tube 612, and a second tubular section 638 in the form of a flow liner which is rigidly coupled to first tubular section 636 by welding or the like.

Annular flange portion 634 is preferably integrally formed with first tubular section 636 of cylindrical portion 630 as a one-piece, unitary member. Annular flange 634 has an annular stop member 640 extending therefrom for engaging second tubular member 618. Stop member 640 limits axial relative movement between first and second tubular members 616 and 618 to prevent seal 622 from being crushed or otherwise damaged during assembly of flexible joint 610. Annular flange portion 634 also has a free end 642 which is rigidly coupled to outer restraining member 620. In particular, free end 642 of annular flange portion 634 is welded to outer restraining member 620 such that an annular space or cavity 644 is formed between first tubular member 616 and outer restraining member 20 for receiving a portion of second tubular member 618 therein.

Annular flange portion 634 also includes an annular sealing surface 646 for engaging seal 622. Sealing surface 646 is configured as a conical sealing surface which faces inwardly towards the longitudinal axis of first tubular member 616.

Second tubular member 618 has a cylindrical portion 650 with a substantially cylindrical fluid passageway 652, and an annular flange portion 654 extending outwardly from cylindrical portion 650. Second tubular member 16 is in the form of a tube adaptor made of a rigid, metallic material such as stainless steel or titanium.

Cylindrical portion 650 has its axis or center line aligned with the axis or center line of cylindrical portion 630 of first tubular member 616 such that the second fluid passageway 652 of second tubular member 618 is substantially aligned with the first fluid passageway 632 of first tubular member 616. Cylindrical portion 650 has second tube 616 rigidly coupled at one end and annular flange portion 654 extending outwardly at its other end. In particular, second tube 614 is welded to cylindrical portion 650, while flange portion 654 is integrally formed with cylindrical portion 650 as a one-piece unitary member.

Flange portion 654 is a spherical segment having an inwardly facing spherical surface 656 and an outwardly facing spherical surface 658. Both spherical surfaces 656 and 658 are substantially smooth, continuous, annular spherical segments with their centers located at the center of flexible joint 610. Inner spherical surface 656 functions as a sealing surface as well as a bearing surface, while outer spherical surface 658 functions as an outer bearing surface. Inner spherical surface 656 contacts and slidably engages a portion of seals 622 as discussed below such that first tubular member 616 and second tubular member 618 can angulate relative to each other as well as rotate relative to each other. More specifically, annular flange portion 654 of second tubular member 618 is movably restrained between seal 622 and bearing ring 621 of outer restraining member 620 for both angular movement and rotational movement.

Preferably, a wear resistant coating is applied to inner and outer spherical surfaces 656 and 658 of flange portion 654 so as to reduce resistant abrasive or adhesive wear due to metal-to-metal contact occurring between flange portion 654 and seal 622 as well as between flange portion 654 and bearing ring 621. One suitable wear resistant coating for use in high temperature applications is TRIBOGLIDE®.

Outer restraining member 620 is made of a rigid metallic material such as stainless steel or titanium, and includes a first annular ring portion 660 and a second annular ring portion 662 integrally formed with first annular ring portion 660 as a one-piece, unitary member. First ring portion 660 is concentrically arranged about the longitudinal axis of first tubular member 616. First ring portion 660 has its first end rigidly coupled to free end 642 of annular flange 634 of first tubular member 616 and its other end integrally formed with second ring portion 662. Ring portion 662 extends substantially perpendicular to the longitudinal axis of first tubular member 616 and extends inwardly from first ring portion 660. The intersection between first and second ring portions 660 and 662 forms an inwardly facing seat 664 for receiving bearing ring 621 therein.

Bearing ring 621 is preferably a shrink-fitted carbon-graphite ring, which has an inwardly facing spherical surface 665 for contacting and slidably engaging annular flange portion 654 of second tubular member 618. Spherical surface 665 is preferably a substantially, smooth continuous segment with its center located at the center of flexible joint 610. Spherical surface 665 is in sliding contact with outer spherical surface 658 of second tubular member 618. Thus, spherical surface 665 functions as an inwardly facing bearing surface for controlling angular and rotational movement of second tubular member 618 relative to first tubular member 616.

Seal 622 is a multiple convolution sealing ring constructed of a flexible resilient, thin metallic foil. Preferably, seal 622 is manufactured from a thin foil of nickel-based super alloy having high strength as well as high temperature mechanical properties and oxidation resistance. Seal 622 is resilient and compliant so as to form to the shape of the sealing surfaces 646 and 656 of tubular member 616 and 618, respectively. In other words, seal 622 can conform to any small deviations existing in sealing surfaces 646 and 656.

Seal 622 includes an annular flange bight 670 having three or more U-shaped annular convolutions, a first annular leg 672 extending from one end of bight 670, and a second annular leg 674 extending from the other end of bight 670. Seal 622 is substantially identical to the multiple convolution sealing ring disclosed in U.S. Pat. No. 4,121,843, issued on Oct. 24, 1978 to Horace P. Halling, the disclosure of which is hereby incorporated herein by reference. Accordingly, seal 622 will not be discussed or illustrated in detail herein. Of course, other multiple convolution seals may be used such as the one disclosed in U.S. Pat. No. 5,249,814, issued on Oct. 5, 1993 to Horace P. Halling.

Bight portion 670 includes a plurality of U-shaped, annular convolutions with each of the U-shaped convolutions having a curved portion and a pair of legs with each leg joining the leg of an adjacent convolution.

First and second legs 672 and 674 are substantially mirror images of each other. Legs 672 and 674 are substantially conically shaped and diverge outwardly from each other as they approach the longitudinal axis of first tubular member 616. Each of the legs 672 and 674 has a curved ring portion 682 and 684, respectively, for engaging sealing surfaces 646 and 656, respectively. Also, as seen in FIG. 13, legs 672 and 674 each includes a concaved portion interconnecting curved portions 682 and 684 to bight 670. Curved portions 682 and 684 are convexly shaped. Instead of, or in addition to, the wear resistant coating being applied to inner spherical surface 656 of tubular member 618, leg 674 of seal 622 can be coated with a wear resistant coating such as TRIBOGLIDE® to reduce abrasive wear between seal 622 and sealing surface 656 as first and second tubular members 616 and 618 angulate or rotate relative to each other. Preferably, seal 622 will be uncoated and only inner spherical surface 656 of tubular member 618 will be coated between the interface of seal 622 and tubular member 618. During assembly of joint 610, seal 622 is elastically deformed or compressed between sealing surfaces 646 and 656 to ensure a fluid-tight seal therebetween.

In operation, the pressurized fluid flowing through joint 610 flows into annular space 644 via a gap 686 to pressure-energized seal 622. In particular, the pressurized fluid flows into the spaces 676 between legs 672 and 674 of seal 622 so as to exert a uniform pressure along the inner surfaces of seal 622. Thus, seal 622 is pressed against sealing surfaces 646 and 656. More specifically, curved portions 682 and 684 of legs 672 and 674 are pressed up against the sealing surfaces 646 and 656, respectively. Accordingly, seal 622 conforms to sealing surfaces 646 and 656 to close any microscopic gaps therebetween.

Figure 15:
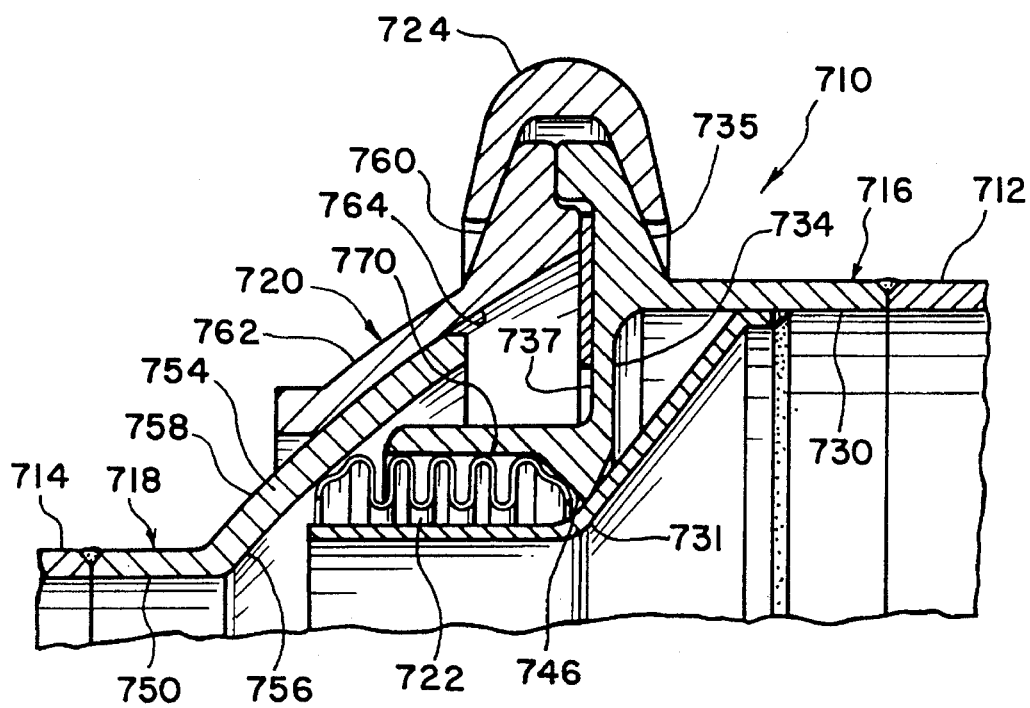
FIG. 15 is an enlarged, partial side elevational view of the flexible pressure-energized joint illustrated in FIG. 14.
Figure 14:
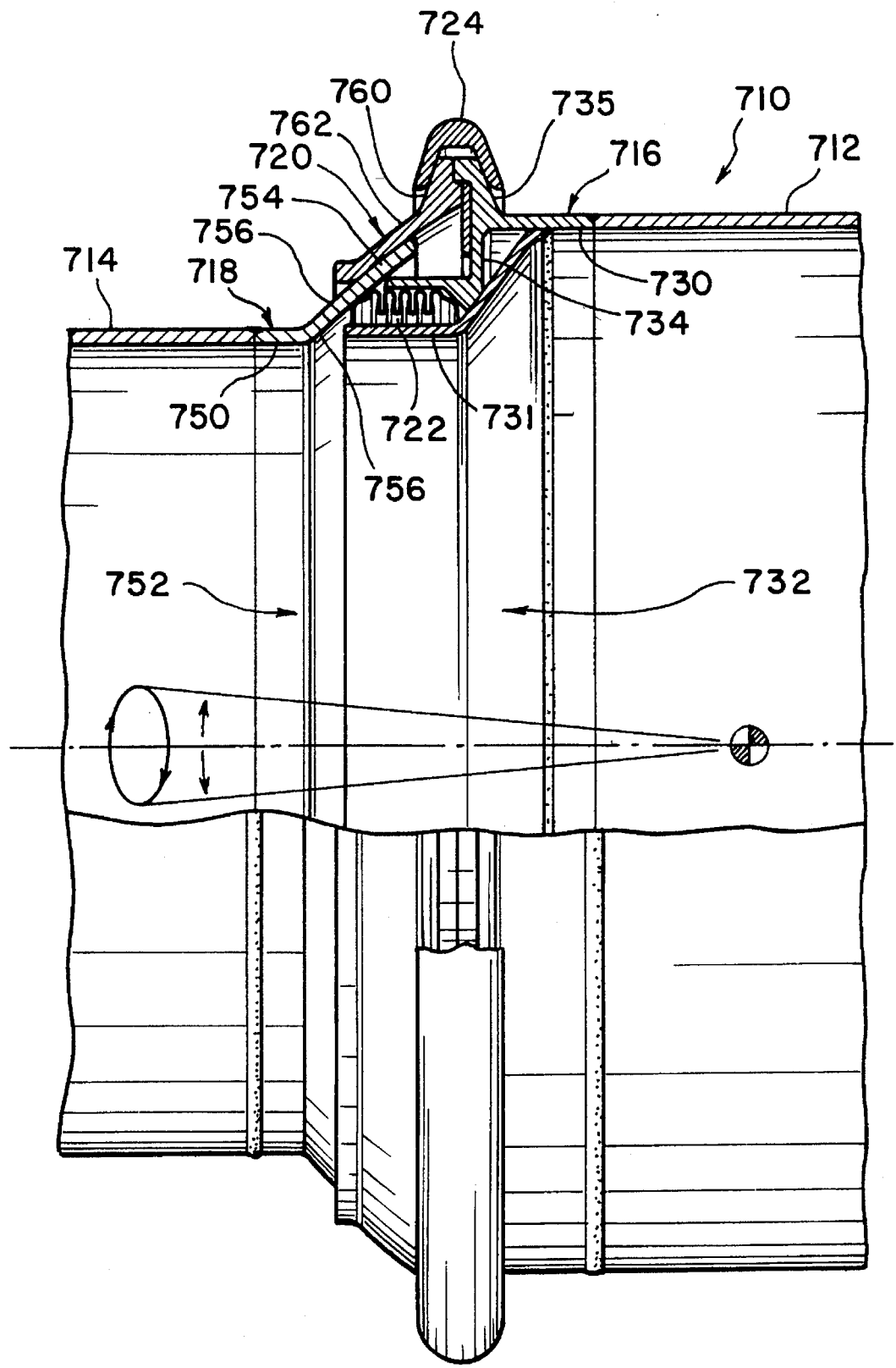
FIG. 14 is a side elevational view in partial longitudinal section of a separable, reducing flexible pressure-energized joint in accordance with an eighth embodiment of the present invention coupling a pair of conduits or tubes together with these tubes having their center lines aligned.

Embodiment of FIGS. 14 and 15

A modified flexible joint 710 in accordance with an eighth embodiment of the present invention is illustrated in FIGS. 14 and 15. Flexible joint 710 includes a first tubular member 716, a second tubular member 718, an outer restraining member 720, a pressure-energized seal 722 and a coupling member 724. Flexible joint 710 is designed to couple a first tube or conduit 712 to a second tube or conduit 714 having a smaller diameter than the first tube 712.

The main differences between flexible joint 710 and flexible joint 610, as discussed above, is that bearing member 621 has been eliminated, first tubular member 716 has been modified so as to be releasably coupled to outer restraining member 720 and to change the fluid flow passage from a larger diameter to a smaller diameter or vice versa. Accordingly, flexible joint 710 will not be discussed in detail, but rather, only the differences between flexible joint 710 and flexible joint 610 will be discussed herein.

First tubular member 716 is in the form of a tube adaptor for rigidly coupling first tube 712 thereto by welding or the like. First tubular member 716 includes a substantially cylindrical portion 730, a flow liner 731 rigidly coupled thereto, and an annular flange portion 734 extending both inwardly and outwardly from cylindrical portion 730. In particular, a first end 736 of cylindrical portion 730 is welded to first tube 712, while the second end 738 has annular flange portion 734 integrally formed therewith. Flow liner 731 is somewhat funnel shaped with the large end rigidly coupled to a central portion of cylindrical portion 730 by welding or the like.

Annular flange portion 734 has an outwardly extending section 735 for engaging coupling member 724 so that outer restraining member 720 can be rigidly coupled to first tubular member 716. Annular flange portion 734 also has an inwardly extending flange portion 737 which has a substantially L-shaped longitudinal cross-section. Section 737 of annular flange portion 734 includes an inwardly facing sealing surface 746 for engaging seal 722. Sealing surface 746 is substantially conically shaped and is concentrically arranged about the longitudinal axis of first tubular member 716. Preferably, sealing surface 746 is a continuous, smooth conical surface with its center line or longitudinal axis coincident with the center lines or longitudinal axis of tubular members 716 and 718.

Second tubular member 718 has a cylindrical portion 750 with a substantially cylindrical fluid passageway 752, and an annular flange portion 754 extending outwardly from cylindrical portion 750. Cylindrical portion 750 has its axis or center line aligned with the axis or center line of cylindrical portion 730 of first tubular member 716 such that the second fluid passageway 752 of second tubular member 716 is substantially aligned with the first fluid passageway of 732 of first tubular member 716 is preferably welded to second tube 714, while flange portion 754 is integrally formed with cylindrical portion 750 as a one-piece unitary member.

Annular flange portion 754 is a spherical segment having an inwardly facing spherical surface 756 and an outwardly facing spherical 758. Both spherical surfaces 756 and 758 are substantially smooth, continuous, annular spherical segments with their centers located at the center of flexible joint 710. Inner spherical surface 756 functions as a sealing surface as well as a bearing surface, while outer spherical surface 758 functions as an outer bearing surface. Inner spherical surface 756 contacts and slidably engages a portion of seal 722 as discussed below such that first tubular member 716 and second tubular member 718 can angulate relative to each other as well as rotate relative to each other.

Outer restraining member 720 includes a first annular ring portion 760 and a second annular ring portion 762 integrally formed with first annular ring portion 760 as a one-piece, unitary member. First ring portion 760 is an outwardly extending flange which is rigidly coupled to flange 734 of first tubular member 716 by coupling member 724. Second ring portion 762 extends inwardly from first ring portion 760 and has an inwardly facing spherical surface 764 for contacting and slidably engaging annular flange portion 754 of second tubular member 718. Spherical surface 764 is preferably a substantially smooth, continuous spherical segment with its center located at the center of flexible joint 710.

Seal 722 is a multiple convolution sealing ring substantially identical to seal 622 discussed above. Accordingly, seal 722 will not be discussed in detail herein.

While various embodiments have been chosen to illustrate the present invention, it will be understood by those skilled in the art that various modifications and changes can be made therein without departing from the scope of the invention as defined in the appended claims.

What is claimed is:

1. A flexible pressure-energized joint, comprising:

a first tubular member having a first annular sealing surface and a first fluid passageway arranged about a first longitudinal axis;

a second tubular member having a second annular sealing surface spaced from said first annular sealing surface to form a seal receiving area, an outwardly facing bearing surface in the form of a first spherically shaped surface, and a second fluid passageway arranged about a second longitudinal axis for fluid communication with said first fluid passageway;

an outer restraining member coupled to said first tubular member to form an annular cavity for movably receiving and retaining therein a portion of said second tubular member with said outwardly facing bearing surface to prevent axial separation of said first and second tubular members, said outer restraining member carrying an inwardly facing bearing surface in the form of a second spherically shaped surface for engaging said outwardly facing bearing surface of said second tubular member to allow rotational and angular movements therebetween; and a pressure-energized seal positioned in said seal receiving area between said first and second annular sealing surfaces of said first and second tubular members, said pressure-energized seal being constructed of a thin metallic foil for metal engagement with said first and second sealing surfaces of said first and second tubular members, said pressure-energized seal including an annular bight, a first annular leg extending from said bight for engaging said first sealing surface of said first tubular member, and a second annular leg extending from said bight for engaging said second sealing surface of said second tubular member, said second annular leg being spaced from said first annular leg to form an annular space in fluid communication with at least one of said first and second passageways, one of said first and second annular legs slidably engaging one of said first and second sealing surfaces during rotational and angular movements between said first and second tubular members.

2. A flexible pressure-energized joint according to claim 1, wherein said first annular sealing surface is conically shaped.

3. A flexible pressure-energized joint according to claim 2, wherein said first annular leg includes a conical portion for engaging said first annular sealing surface.

4. A flexible pressure-energized joint according to claim 3, wherein said first annular sealing surface faces outwardly from said first tubular member.

5. A flexible pressure-energized joint according to claim 3, wherein said first annular sealing surface faces inwardly from said first tubular member.

6. A flexible pressure-energized joint according to claim 1, wherein said outer restraining member is fixedly and non-removably coupled to said first tubular member.

7. A flexible pressure-energized joint according to claim 1, further comprising a coupling member for removably coupling said outer restraining member to said first tubular member.

8. A flexible pressure-energized joint according to claim 1, wherein said outer restraining member includes a separate bearing ring having said inwardly facing bearing surface thereon.

9. A flexible pressure-energized joint according to claim 1, wherein said first tubular member includes a first substantially cylindrical portion forming said first fluid passageway and a first annular flange portion extending outwardly from said first cylindrical portion with said first annular sealing surface being formed on said first annular flange portion.

10. A flexible pressure-energized joint according to claim 9, wherein
said cylindrical portion is a tube adaptor with a free cylindrical end for coupling a tube thereto.

11. A flexible pressure-energized joint according to claim 10, wherein
said tube adaptor includes a second annular flange for engaging coupling member.

12. A flexible pressure-energized joint according to claim 9, wherein
said second tubular member includes a second substantially cylindrical portion forming said second fluid passageway and a second annular flange portion extending outwardly from said second cylindrical portion, said second annular flange portion being a spherical segment carrying said second annular sealing surface and said outwardly facing bearing member.

13. A flexible pressure-energized joint according to claim 12, wherein
said first cylindrical portion includes a flow liner positioned between said seal and said first longitudinal axis.

14. A flexible pressure-energized joint according to claim 13, wherein
said first cylindrical portion and said flow liner are integrally formed as a one-piece, unitary member.

15. A flexible pressure-energized joint according to claim 13, wherein
said flow-liner is constructed as a separate member which is fixedly coupled to said first cylindrical portion.

16. A flexible pressure-energized joint according to claim 13, wherein
said flow liner has a free end positioned adjacent said second tubular member and normal spaced from said second tubular member by a small gap, said gap being sized smaller than said seal so that said free end of said flow liner acts as a stop surface to limit axial movement of said first and second tubular members towards each other and to prevent said annular space of said seal from being collapsed between said first and second sealing surfaces.

17. A flexible pressure-energized joint according to claim 12, wherein
one of said first and second cylindrical portions is formed as part of a flow device.

18. A flexible pressure-energized joint according to claim 12, wherein
said first and second cylindrical portions form first and second tube adaptors having free cylindrical ends for coupling first and second tubes to said joint, respectively.

19. A flexible pressure-energized joint according to claim 18, wherein
one of said first and second tube adaptors has a smaller inner diameter than the other of said first and second tube adaptors.

20. A flexible pressure-energized joint according to claim 12, wherein
said bight of said seal is substantially C-shaped in longitudinal cross-section with said first and second legs integrally coupled thereto.

21. flexible pressure-energized joint according to claim 20, wherein
said outer restraining member includes a separate bearing ring having said inwardly facing bearing surface thereon.

22. A flexible pressure-energized joint according to claim 12, wherein
said bight includes multiple convolutions extending between said first and second annular legs.

23. A flexible pressure-energized joint according to claim 22, wherein
said outer restraining member includes a separate bearing ring having said inwardly facing bearing surface thereon.

24. A flexible pressure-energized joint according to claim 1, wherein
said bight of said seal is out of round as viewed along said first longitudinal axis to provide an interference fit with a portion of said first tubular member.

25. A flexible pressure-energized joint according to claim 1, wherein
said second annular sealing surface is spherically shaped.

26. A flexible pressure-energized joint according to claim 1, wherein
said first annular sealing surface is conically shaped for engaging a portion of said first annular leg, and
said second annular sealing surface is spherically shaped for slidably engaging a portion of said second annular leg.

27. A flexible pressure-energized joint according to claim 26, wherein
said bight of said seal is substantially C-shaped in longitudinal cross-section with said first and second legs integrally coupled thereto.

28. A flexible pressure-energized joint according to claim 27, wherein
said first annular sealing surface faces outwardly from said first tubular member towards said second annular sealing surface, and
said second annular sealing surface faces inwardly from said second tubular member towards said first annular sealing surface.

29. A flexible pressure-energized joint according to claim 28, wherein
said first and second legs are substantially conical in longitudinal cross-section with said second leg having a curved ring portion.

30. A flexible pressure-energized joint according to claim 29, wherein
said conical portion of said first annular leg has a substantially flat, planar longitudinal cross-section.

31. A flexible pressure-energized joint according to claim 28, wherein
said second annular leg includes a conical portion interconnecting said bight to a curved ring portion.

32. A flexible pressure-energized joint according to claim 26, wherein
said bight includes multiple convolutions extending between said first and second annular legs.

33. A flexible pressure-energized joint according to 32, wherein
said first and second annular legs are substantially conical in longitudinal cross-section.

34. A flexible pressure-energized joint according to claim 33, wherein
said first annular sealing surface faces inwardly from said first tubular member, and said second annular sealing surface faces inwardly from said second tubular member.

35. A flexible pressure-energized joint according to claim 34, wherein said first and second annular legs extend inwardly from said bight and diverge away from each other.

36. A flexible pressure-energized joint, comprising:

a first tubular member having a first annular sealing surface and a first fluid passageway arranged about a first longitudinal axis;

a second tubular member having a second spherically shaped annular sealing surface spaced from said first annular sealing surface to form a seal receiving area, an outwardly facing bearing surface in the form of a spherically shaped surface, and a second fluid passageway arranged about a second longitudinal axis for fluid communication with said first fluid passageway;

an outer restraining member coupled to said first tubular member to form an annular cavity for movably receiving and retaining therein a portion of said second tubular member with said outwardly facing bearing surface to prevent axial separation of said first and second tubular members, said outer restraining member carrying an inwardly facing bearing surface in the form of a spherically shaped surface for engaging said outwardly facing bearing surface of said second tubular member to allow rotational and angular movements therebetween; and a pressure-energized seal positioned in said seal receiving area between said first and second annular sealing surfaces of said first and second tubular members, said pressure-energized seal being constructed of a thin metallic foil and including an annular bight, a first annular leg extending from said bight for engaging said first sealing surface of said first tubular member, and a second annular leg extending from said bight for engaging said second sealing surface of said second tubular member, said second annular leg being spaced from said first annular leg to form an annular space in fluid communication with at least one of said first and second passageways, one of said first and second annular legs slidably engaging one of said first and second sealing surfaces during rotational and angular movements between said first and second tubular members, said second annular leg including a ring portion having a curved longitudinal cross-section for engaging said second spherically shaped annular sealing surface.

37. A flexible pressure-energized joint according to claim 36, wherein said second annular sealing surface faces inwardly from said second tubular member.

38. A flexible pressure-energized joint, comprising:

a first tubular member having a first annular sealing surface and a first fluid passageway arranged about a first longitudinal axis;

a second tubular member having a second annular sealing surface spaced from said first annular sealing surface to form a seal receiving area, an outwardly facing bearing surface in the form of a first spherically shaped surface, and a second fluid passageway arranged about a second longitudinal axis for fluid communication with said first fluid passageway;

an outer restraining member coupled to said first tubular member to form an annular cavity for movably receiving and retaining therein a portion of said second tubular member with said outwardly facing bearing surface to prevent axial separation of said first and second tubular members, said outer restraining member carrying an inwardly facing bearing surface in the form of a second spherically shaped surface for engaging said outwardly facing bearing surface of said second tubular member to allow rotational and angular movements therebetween; and a pressure-energized seal positioned in said seal receiving area between said first and second annular sealing surfaces of said first and second tubular members, said pressure-energized seal being constructed of a thin metallic foil and including an annular bight having multiple convolutions, a first annular leg extending from a first end of said multiple convolutions of said bight for engaging said first sealing surface of said first tubular member, and a second annular leg extending from a second end of said multiple convolutions of said bight for engaging said second sealing surface of said second tubular member, said second annular leg being spaced from said first annular leg to form an annular space in fluid communication with at least one of said first and second passageways, one of said first and second annular legs slidably engaging one of said first and second sealing surfaces during rotational and angular movements between said first and second tubular members, said first annular sealing surface facing inwardly from said first tubular member and being conically shaped for engaging a portion of said first annular leg, said second annular sealing surface facing inwardly from said second tubular member and being spherically shaped for slidably engaging a portion of said second annular leg, and said first and second annular legs being substantially conical in longitudinal cross-section with each of said first and second annular legs including an outer convex portion coupled to said bight, an inner convex portion and a concave portion joining said outer convex portion.

39. A flexible pressure-energized joint, comprising:

a first tubular member having a first substantially cylindrical portion forming a first fluid passageway arranged about a first longitudinal axis, and a first annular flange portion with a first annular sealing surface extending outwardly from said first cylindrical portion;

a second tubular member having a second substantially cylindrical portion forming a second fluid passageway arranged about a second longitudinal axis for fluid communication with said first fluid passageway, and a second annular flange portion in the form of a spherical segment with a second annular sealing surface extending outwardly from said second cylindrical portion and spaced from said first annular sealing surface to form a seal receiving area, and an outwardly facing bearing surface in the form of a first spherically shaped surface;

an outer restraining member coupled to said first tubular member to form an annular cavity for movably receiving and retaining therein a portion of said second tubular member with said outwardly facing bearing surface to prevent axial separation of said first and second tubular members, said outer restraining member carrying an inwardly facing bearing surface in the form of a second spherically shaped surface for engaging said outwardly facing bearing surface of said second tubular member to allow rotational and angular movements therebetween; and a pressure-energized seal positioned in said seal receiving area between said first and second annular sealing surfaces of said first and second tubular members, said pressure-energized seal being constructed of a thin metallic foil and including an annular bight with a substantially C-shaped longitudinal cross-section, a first annular leg extending from said bight and integrally formed therewith for engaging said first sealing surface of said first tubular members, and a second annular leg extending from said bight and integrally formed therewith for engaging said second sealing surface of said second tubular member, said second annular leg being spaced from said first annular leg to form an annular space in fluid communication with at least one of said first and second passageways, one of said first and second annular legs slidably engaging one of said first and second sealing surfaces during rotational and angular movements between said first and second tubular members, said first annular leg including a ring portion extending therefrom in a direction substantially parallel to said first longitudinal axis for engaging said first annular flange via an interference fit to retain said seal on said first tubular member.

40. A flexible pressure-energized joint according to claim 39, wherein said ring portion is out of round as viewed along said first longitudinal axis to provide said interference fit.

41. A metallic conical pressure-energized seal for sealing a joint, comprising:

an annular bight having a longitudinal axis;

a first annular leg extending inwardly from said bight towards the longitudinal axis and having an inwardly facing sealing surface for engaging a first sealing surface of a joint;

a ring portion extending from said first annular leg in a direction substantially parallel to said longitudinal axis for engaging a joint via an interference fit to retain said seal thereon; and a second annular leg extending inwardly from said bight towards the longitudinal axis and having an outwardly facing sealing surface for engaging a second sealing surface of a joint, said second annular leg being spaced from said first annular leg to form an annular space having an inwardly facing annular opening remote from said bight so that said annular opening faces inwardly towards the longitudinal axis to receive a pressurized fluid therein;

said bight, said ring portion and said legs all being formed of a thin metallic foil.

42. A conical pressure-energized seal according to claim 41, wherein said ring portion is a continuous annular ring.

43. A conical pressure-energized seal according to claim 42, wherein said ring portion is out of round as viewed along said longitudinal axis to provide said interference fit.

44. A conical pressure-energized seal according to claim 43, wherein said ring portion has a convexly curved longitudinal cross-section.

* * * * *